(12) United States Patent
Kim

(10) Patent No.: US 7,849,257 B1
(45) Date of Patent: Dec. 7, 2010

(54) METHOD AND APPARATUS FOR STORING AND RETRIEVING DATA

(75) Inventor: Han-gyoo Kim, Irvine, CA (US)

(73) Assignee: Zhe Khi Pak, Moscow (RU)

( * ) Notice: Subject to any disclaimer, the term of this patent is extended or adjusted under 35 U.S.C. 154(b) by 1292 days.

(21) Appl. No.: 11/326,810

(22) Filed: Jan. 6, 2006

Related U.S. Application Data

(60) Provisional application No. 60/642,372, filed on Jan. 6, 2005.

(51) Int. Cl.
*G06F 13/00* (2006.01)

(52) U.S. Cl. ................ 711/112; 711/161; 711/162; 707/689

(58) Field of Classification Search .......... 711/112
See application file for complete search history.

(56) References Cited

U.S. PATENT DOCUMENTS

| | | |
|---|---|---|
| 5,329,619 A | 7/1994 | Page et al. |
| 5,426,427 A | 6/1995 | Chinnock et al. |
| 5,463,772 A | 10/1995 | Thompson et al. |
| 5,513,314 A | 4/1996 | Kandasamy et al. |
| 5,524,247 A | 6/1996 | Mizuno |
| 5,566,331 A | 10/1996 | Irwin et al. |
| 5,721,818 A | 2/1998 | Hanif et al. |
| 5,774,660 A | 6/1998 | Brendel et al. |
| 5,781,550 A | 7/1998 | Templin et al. |
| 5,812,930 A | 9/1998 | Zavrel |
| 5,838,916 A | 11/1998 | Domenikos et al. |
| 5,889,942 A | 3/1999 | Orenshteyn |
| 5,987,523 A | 11/1999 | Hind et al. |
| 5,987,627 A | 11/1999 | Rawlings, III |
| 5,999,808 A | 12/1999 | LaDue |
| 6,047,307 A | 4/2000 | Radko |
| 6,085,234 A | 7/2000 | Pitts et al. |
| 6,128,644 A | 10/2000 | Nozaki |
| 6,128,690 A | 10/2000 | Purcell et al. |
| 6,167,490 A | 12/2000 | Levy et al. |
| 6,175,869 B1 | 1/2001 | Ahuja et al. |
| 6,216,202 B1 | 4/2001 | D'Errico |
| 6,314,465 B1 | 11/2001 | Paul et al. |
| 6,317,775 B1 | 11/2001 | Coile et al. |
| 6,327,594 B1 | 12/2001 | Van Huben et al. |

(Continued)

FOREIGN PATENT DOCUMENTS

DE 19610840 9/1997

(Continued)

OTHER PUBLICATIONS

Japanese Office Action, App. No. 555298/2002, Jan. 9, 2007.

(Continued)

*Primary Examiner*—Hetul Patel
(74) *Attorney, Agent, or Firm*—Rothwell, Figg, Ernst & Manbeck, P.C.

(57) ABSTRACT

A method and apparatus for storing and retrieving data. The embodiment may maintain all previously-written data in a portion of a storage device, such as a hard disk, writable optical media, or memory, for an indefinite period. Old data is not overwritten unless the storage capacity of the storage device is exceeded. Accordingly, prior versions of data may be accessed by the embodiment as desired.

3 Claims, 26 Drawing Sheets

U.S. PATENT DOCUMENTS

| | | | |
|---|---|---|---|
| 6,345,300 B1 | 2/2002 | Bakshi et al. | |
| 6,347,095 B1 | 2/2002 | Tang et al. | |
| 6,356,915 B1 | 3/2002 | Chtchetkine et al. | |
| 6,360,265 B1 | 3/2002 | Falck et al. | |
| 6,366,988 B1 | 4/2002 | Skiba et al. | |
| 6,389,432 B1 | 5/2002 | Pothapragada et al. | |
| 6,393,569 B1 | 5/2002 | Orenshteyn | |
| 6,404,766 B1 | 6/2002 | Kitai et al. | |
| 6,421,753 B1 | 7/2002 | Hoese et al. | |
| 6,449,647 B1 | 9/2002 | Colby et al. | |
| 6,470,389 B1 | 10/2002 | Chung et al. | |
| 6,510,164 B1 | 1/2003 | Ramaswamy et al. | |
| 6,518,965 B2 | 2/2003 | Dye et al. | |
| 6,523,066 B1 | 2/2003 | Montroy et al. | |
| 6,529,996 B1 | 3/2003 | Nguyen et al. | |
| 6,539,446 B1 | 3/2003 | Chan | |
| 6,578,111 B1 | 6/2003 | Damron et al. | |
| 6,594,677 B2 | 7/2003 | Davis et al. | |
| 6,598,068 B1 | 7/2003 | Clark | |
| 6,609,167 B1 | 8/2003 | Bastiani et al. | |
| 6,647,016 B1 | 11/2003 | Isoda et al. | |
| 6,732,104 B1 | 5/2004 | Weber | |
| 6,760,783 B1 | 7/2004 | Berry | |
| 6,807,581 B1 | 10/2004 | Starr et al. | |
| 6,823,458 B1 | 11/2004 | Lee et al. | |
| 6,834,326 B1 | 12/2004 | Wang et al. | |
| 6,894,981 B1 | 5/2005 | Coile et al. | |
| 6,941,576 B2 | 9/2005 | Amit | |
| 7,010,303 B2 | 3/2006 | Lewis et al. | |
| 7,069,312 B2 | 6/2006 | Kostic et al. | |
| 7,069,350 B2 | 6/2006 | Fujita et al. | |
| 7,076,690 B1 | 7/2006 | Todd et al. | |
| 7,124,128 B2 | 10/2006 | Springer et al. | |
| 7,251,704 B2 | 7/2007 | Solomon et al. | |
| 7,254,578 B2 | 8/2007 | Devarakonda et al. | |
| 7,257,690 B1 * | 8/2007 | Baird | 711/162 |
| 7,277,955 B2 | 10/2007 | Elliott | |
| 7,376,133 B2 | 5/2008 | Gettala et al. | |
| 7,383,229 B2 | 6/2008 | Jacoby | |
| 7,447,850 B1 * | 11/2008 | Del Rosso et al. | 711/156 |
| 2002/0069245 A1 | 6/2002 | Kim | |
| 2002/0103814 A1 * | 8/2002 | Duvillier et al. | 707/202 |
| 2003/0014569 A1 | 1/2003 | Kim | |
| 2003/0018403 A1 | 1/2003 | Braun et al. | |
| 2003/0028614 A1 | 2/2003 | Jeon | |
| 2003/0172149 A1 | 9/2003 | Edsall et al. | |
| 2003/0225834 A1 | 12/2003 | Lee et al. | |
| 2004/0068563 A1 | 4/2004 | Ahuja et al. | |
| 2004/0117813 A1 | 6/2004 | Karaoguz et al. | |
| 2004/0220933 A1 | 11/2004 | Walker | |
| 2005/0042591 A1 | 2/2005 | Bloom et al. | |
| 2005/0110768 A1 | 5/2005 | Marriott et al. | |
| 2005/0149682 A1 | 7/2005 | Kim | |
| 2005/0193017 A1 | 9/2005 | Kim | |
| 2005/0193189 A1 | 9/2005 | Kim | |
| 2006/0004935 A1 | 1/2006 | Seto et al. | |
| 2006/0010287 A1 | 1/2006 | Kim | |
| 2006/0045130 A1 | 3/2006 | Kim | |
| 2006/0067356 A1 | 3/2006 | Kim | |
| 2006/0069884 A1 | 3/2006 | Kim | |
| 2006/0155805 A1 | 7/2006 | Kim | |
| 2007/0008988 A1 | 1/2007 | Kim | |

FOREIGN PATENT DOCUMENTS

| | | |
|---|---|---|
| DE | 10038142 | 2/2001 |
| JP | 10113469 | 5/1998 |
| JP | 10271562 | 10/1998 |
| JP | 11114224 | 4/1999 |
| KR | 2000072493 | 12/2000 |
| KR | 2001088528 | 9/2001 |
| WO | WO99/03297 | 7/1999 |
| WO | WO00/29529 | 5/2000 |

OTHER PUBLICATIONS

Japanese Office Action, App. No. 513300/2003, Feb. 6, 2007.

Blunden et al., "Storage Network Virtualization: What's it all about?", ibm.com/redbooks, XP-002286341, pp. 1-110, Dec. 2000.

Klein, Yaron, "Storage Virtualization with iSCSI Protocol", Internet Draft, XP-015030964, pp. 1-15, Nov. 2, 2000.

Schulz, Greg, "SAN and NAS; Complementary Technologies", http://www.mti.com/white_papers/WP20002.pdf, XP-002201566, pp. 1-7, May 1, 2000.

* cited by examiner

| | timestamp | Host view block # | Previous physical block # | Current physical block # | R |
|---|---|---|---|---|---|
| 405a → | T1 | 1 | 25 | 56 | |
| 405b → | T2 | 5 | null | 91 | |
| 405c → | T3 | 2 | 72 | 32 | |
| 405d → | T4 | 3 | 77 | 33 | |
| 405e → | T5 | 5 | 91 | 92 | |
| 405f → | T6 | 5 | 92 | 47 | |
| 405g → | | | | | |

Fig. 6

| | 410 | 415 | 400  420 | 425 | 430 |
|---|---|---|---|---|---|
| 405e → | T5 | 5 | 91 | 92 | |
| 405f → | T6 | 5 | 92 | 47 | |
| 405g → | | | | | |

| Timestamp | Logical Block | Data |
|---|---|---|
| 1/5/04 16:33 (T0) | 1000 | File 1 |
| 1/5/04 16:37 | 1100 | File 2 |
| 5/17/04 8:18 | M+2600 | File 2 |
| 8/22/04 22:22 (T1) | M+3000 | File 1 |
| 10/9/04 12:00 (T2) | M+10000 | File 1 |
| 11/15/04 13:56 (TC) | M+3800 | File 1 |

| Timestamp | Logical Block | Data |
|---|---|---|
| 1/5/04 16:33 (T0) | 1000 | File 1 |
| 1/5/04 16:37 | 1100 | File 2 |
| 5/17/04 8:18 | M+2600 | File 2 |
| 8/22/04 22:22 (T1) | M+3000 | File 1 |
| 10/9/04 12:00 (T2) | M+10000 | File 1 |
| 11/15/04 13:56 (TC) | M+3800 | File 1 |
| 11/15/04 13:56 (TC) | 1200 | File 1 |
| 11/15/04 13:56 (TC) | 1300 | File 2 |

| Timestamp | Logical Block | Data |
|---|---|---|
| 11/15/04 13:56 (TC) | 1200 | File 1 |
| 11/15/04 13:56 (TC) | 1300 | File 2 |

| Timestamp-virgin write | Virgin Logical Block | Timestamp- last write | Logical Block | Data |
|---|---|---|---|---|
| 1/5/04 16:33 (T0) | 1000 | 1/5/04 16:33 (T0) | 1000 | File 1 |
| 1/5/04 16:37 | 1100 | 1/5/04 16:37 | 1100 | File 2 |
| 1/5/04 16:37 | 1100 | 5/17/04 8:18 | M+2600 | File 2 |
| 1/5/04 16:33 (T0) | 1000 | 8/22/04 22:22 (T1) | M+3000 | File 1 |
| 1/5/04 16:33 (T0) | 1000 | 10/9/04 12:00 (T2) | M+10000 | File 1 |
| 1/5/04 16:33 (T0) | 1000 | 11/15/04 13:56 (TC) | M+3800 | File 1 |

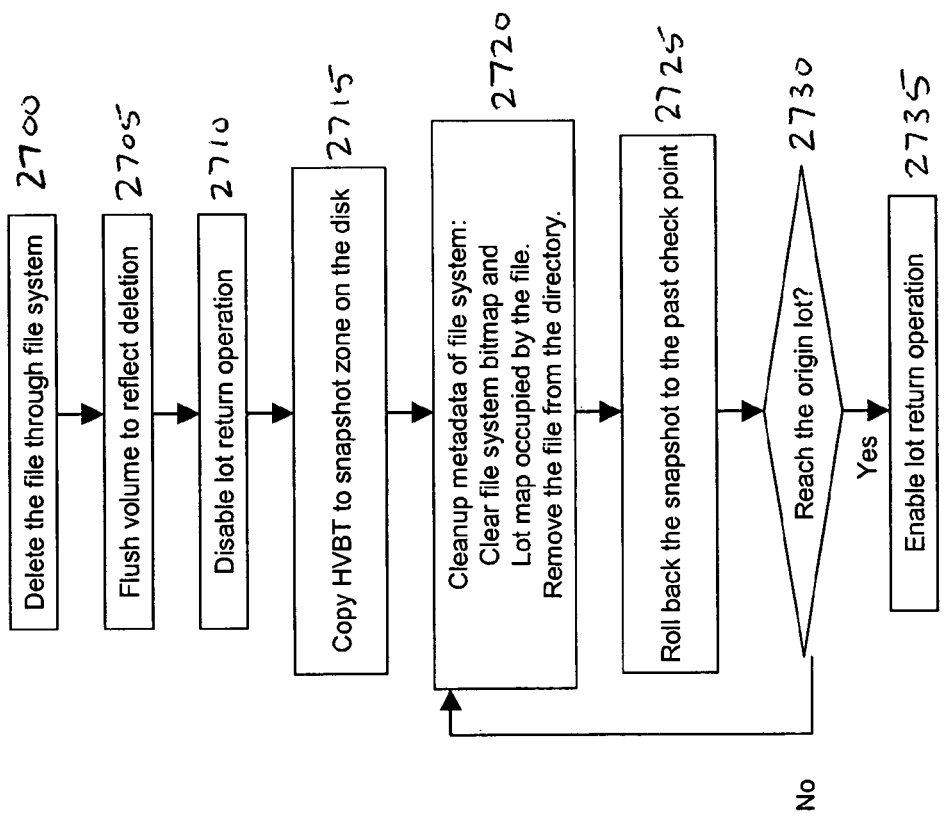

METHOD AND APPARATUS FOR STORING AND RETRIEVING DATA

CROSS-REFERENCES TO RELATED APPLICATIONS

This application claims the benefit under 35 U.S.C. §119(e) to U.S. Provisional Application No. 60/642,372, filed on Jan. 6, 2005, and entitled "Method and Apparatus for Storing and Retrieving Data," the disclosure of which is hereby incorporated herein in its entirety.

BACKGROUND OF THE INVENTION

1. Technical Field

The present invention relates generally to a method and apparatus for storing and retrieving data, and more particularly to methods and apparatuses for retrieving data affected by a virus, disk error, or other catastrophic failure.

2. Description of Related Art

Much of the world's information is stored in computers. Storage devices come in a variety of formats, including memory-based, magnetic, and optical. Most, if not all, storage devices are vulnerable to errors in reading and writing data, which may corrupt valuable information. Similarly, malicious parties often release programs or applications designed to corrupt data. These programs are commonly referred to as "viruses." Viruses, or intrusion into a computer's storage by a third party through other means, can cause irreparable loss of data.

Accordingly, there is a need in the art for an improved method and apparatus for saving, restoring, and auditing data and computer-accessible information.

BRIEF SUMMARY OF THE INVENTION

One embodiment of the present invention takes the form of a method and apparatus for storing and retrieving data. The embodiment may maintain all previously-written data in a portion of a storage device, such as a hard disk, writable optical media, or memory, for an indefinite period. Old data is not overwritten unless the storage capacity of the storage device is exceeded. Accordingly, prior versions of data may be accessed by the embodiment as desired.

The invention may transform an append-only disk write operation into a single available disk write operation, thus keeping all the written data previously stored on the storage device. Accordingly, such data may be retrieved as necessary. In one embodiment, three general operations are carried out by the embodiment to permit such retrieval: (1) the embodiment determines the physical blocks storing data corresponding to a particular "snapshot" of a given time; (2) the embodiment determines what physical blocks store data corresponding to a logical view used by a file system or host; and (3) the embodiment determines which physical blocks are available for data storage, and which are in use. The embodiment may, for example, employ a time log table, logical/physical block conversion table, and available block bitmap to carry out these operations.

The embodiment may employ such information to roll back and/or forward to any moment of the history of the storage device's operation. Thus, the embodiment may recover data from any moment, irregardless of any sort of data corruption caused by a virus or operational error.

Another embodiment of the present invention embodiment may segment a storage element (such as a magnetic disk, optical read/write disk, or flash memory storage) into a first-write, or "virgin" area, and a later-write, or "overwrite" area. When a file or data is written to a storage element for the first time, it is written into the virgin area. When a file or data is written to the storage element any time after the first write, it is written into a block in the overwrite area. A record, including a timestamp, is created in a table for each write operation, regardless of whether the write occurred in the virgin or overwrite area.

The embodiment may restore data from the storage device by determining a restore time. The embodiment scans the records in the table to determine if the records' timestamps are equal to or predate the restore time. The embodiment locates the chronologically latest record for each unique file/data that occurs prior to at the same time as the restore time, and retrieves the corresponding iteration of the file/data. That iteration replaces the current version of the file/data.

Such restoring may prove particularly useful in recovering from a computer virus, crash, or corrupt files.

An embodiment of the present invention may take the form of a method for storing data on a storage medium, including the operations of writing a first datum to the storage medium at a first physical location, associating a first host view location with the first physical location, storing an indicator of the writing of the first datum, and storing the association between the first host view location and the first physical location.

Another embodiment of the present invention may take the form of an apparatus for storing data, including a metadata area, a storage area operatively associated with the metadata area and comprising at least a first and second physical block, a host view block table operative to associate a first host block with the first physical block, and a first log operatively associated with a first datum.

Yet another embodiment may take the form of an apparatus for controlling storage of a datum on a storage medium, the data provided by a host, the apparatus including a module for controlling the writing of the datum to a physical block of a storage medium, a module for updating a host view block table by creating a correspondence between the physical block and a host view block seen by the host, and a module for creating a log corresponding to the writing of data. In such an embodiment, the log may include a pointer associating the log with the host view block table, an order indicator; and a previous block address associating the log with a prior storage of the datum.

Still another embodiment may take the form of a method for retrieving a datum from a storage medium, including the operations of determining a desired time at which the datum was written to a first physical block on the storage medium, accessing a first log of a plurality of logs, the first log containing a previous physical address corresponding to a second physical block, resetting a host view block to point to the second physical block by means of the previous physical address, and determining if the first log was generated after the desired time. In such an embodiment, in the event the first log was generated after the desired time, the following operations may also be performed: A) accessing a second log of the plurality of logs, the second log containing a second previous physical address corresponding to a third physical block; B) resetting the host view block to point to the third physical block by means of the second previous physical address; and C) determining if the second log was generated after the desired time.

These and other advantages, benefits, and features of the present invention will become apparent to those of ordinary skill in the art upon reading the detailed description.

BRIEF DESCRIPTION OF THE FIGURES

FIG. 2 depicts an exemplary available block bitmap.

FIG. 4 depicts an exemplary time log.

FIG. 6 depicts the time log of FIG. 4, following a truncation operation.

FIG. 13 depicts an alternate embodiment of the look-up table of FIG. 11, in accordance with the embodiment of FIG. 9.

FIG. 27 is a flowchart generally depicting an operation for returning lots associated with a file to a lot pool.

DETAILED DESCRIPTION

One embodiment of the present invention takes the form of a method and apparatus for storing and recovering data. Generally speaking, the embodiment may segment a storage element (such as a magnetic disk, optical read/write disk, or flash memory storage) into a first-write, or "virgin" area, and a later-write, or "overwrite" area. When data is written to a storage element for the first time, it is written into the virgin area. When data is written to the storage element any time after the first write, it is written into the overwrite area. It should be noted that the term "disk" is used for purposes of convenience throughout this document to describe any form of readable and writable computer-implemented storage, and accordingly is not necessarily limited to magnetic storage media. It should also be understood that the various embodiments described below may be contained on one or more of the following: the storage element, a second storage element, chips embedded on the storage element, controllers for the storage element, or any other storage element or hardware device. The various methods and embodiments described herein may, for example, be configured as one or more software or hardware modules operative to carry out the disclosed functions. Further, embodiments of the present invention may be located with a host, a storage device (alternately referred to as a "storage medium"), or may stand alone. Embodiments of the present invention may communicate with either the host or storage device through a network, such as the Internet, an Ethernet, a wireless network, a wired network, a telephone system, or any other network known to those of ordinary skill in the art.

Figure 1:
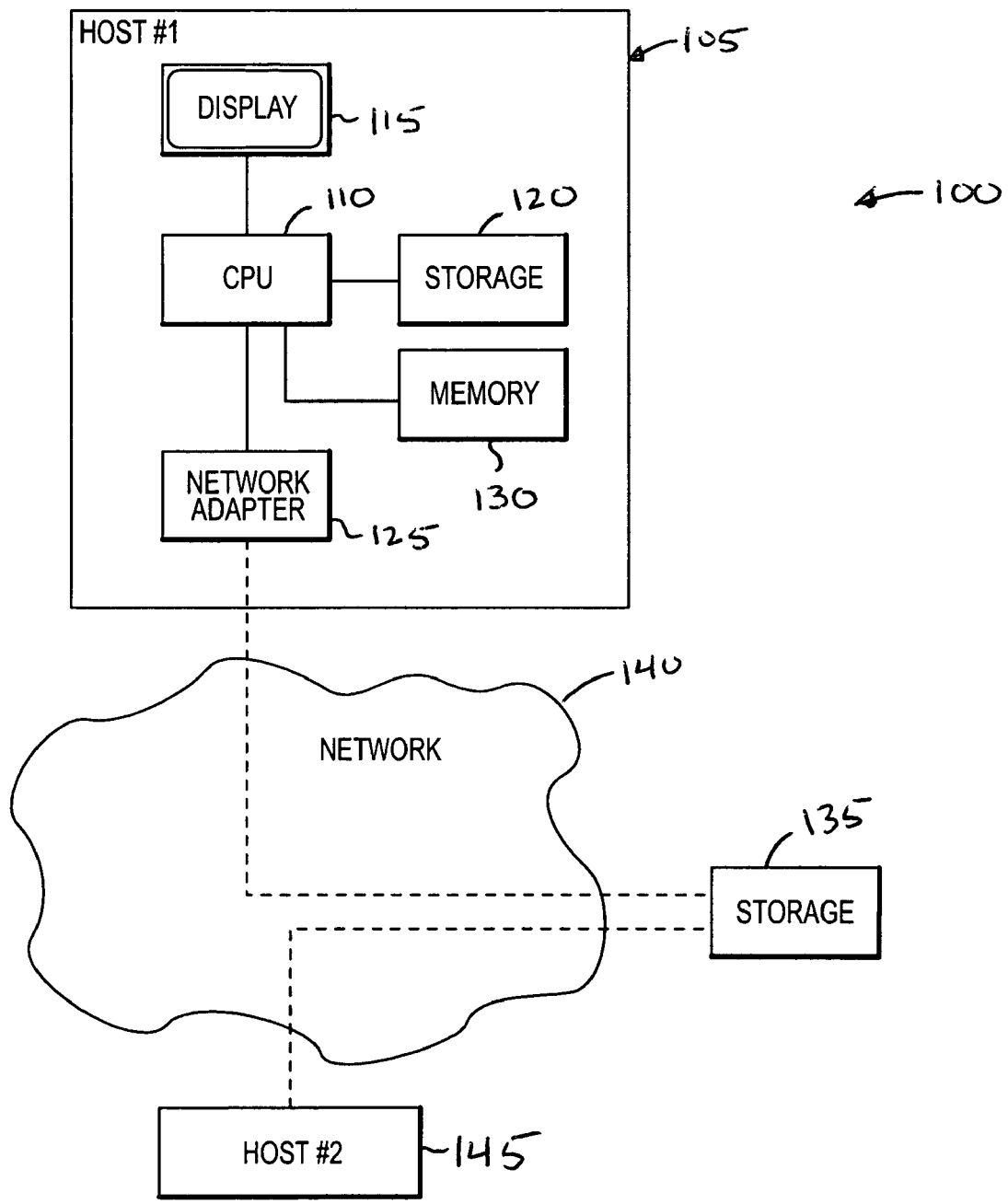
FIG. 1 depicts an exemplary host, storage device, and network.

FIG. 1 depicts a typical computing environment 100. A host 105 generally includes a central processing unit (CPU) 110, and may include one or more additional elements, such as a display device 115, a storage device 120 (which may be magnetic, optical, or memory-based), a network adapter 125, a memory 130, and so forth. The CPU 110 performs a variety of functions and typically controls the overall operation of the host 105 and interaction of the various host elements.

Some embodiments of the present invention may permit the host 105 to access a remotely-located storage device 135 across a network 140, as also shown in FIG. 1. Yet other embodiments may omit the network 140, and permit a host 105 to access only a local storage device 120. The operation of the embodiment with respect to the reading and writing of data from a storage device is functionally identical, regardless of whether or not the storage device is accessed by means of a system bus (or other local means) or across a network 140.

Most hosts 105, 145 employ an operating system to manage and direct the operation of various applications as well as the reading and writing of data to and from storage media and devices 120, 135. The operating system typically employs a file system, such as a file allocation table (FAT), NT file system (NTFS), Macintosh file system, distributed file system, high performance file system, and so forth, to store and access data on a storage device. For example, the FAT file system divides a hard disk or other magnetic storage medium into partitions, each of which contain clusters. Each cluster may include one or more sectors, depending on the size of the disk partition. Each cluster is either allocated to a file or directory or is free (i.e., unused for data storage). A directory lists the name, size, modification time and starting cluster of each file or subdirectory it contains. As used herein, the term "block" refers to a generic unit of storage on a storage device, and may be any numbers of clusters or sectors.

At the start of each disk partition is a table (the FAT) with one entry for each block. Each entry gives the number of the next block in the same file, a special value indicating the block is not allocated, or a special value indicating the block is the last in the chain. The first few blocks after the FAT typically contain a root directory. Thus, the FAT file system manages data access and storage, and keeps a table indicating what data is stored at or on a particular block of the storage medium.

Current file systems, however, are relatively poor for backing up data. Most file systems require a user make a copy of the data, or that an application do the same. The copy is treated as a completely separate file and data element by the file system. Thus, backing up data is relatively inefficient. Further, most file systems do not provide any method for restoring data in the event data is corrupted. For example, bad writes to the storage medium may corrupt a computer file, or a virus or third party attack on a file system may result in data loss. Viruses are of particular concern insofar as they may replicate themselves, remain dormant for a time, and resurface to corrupt data again and again.

In a first embodiment, three data structures may be used to provide time-sensitive data retrieval. The embodiment may, for example, present a view of data resident on the disk at any prior time by using these three data structures. That is, the effective state of the storage device 135 may be "rolled back" to permit a user to access data blocks as they existed at a prior time. The embodiment may effectively provide a "snapshot" of a storage device's 135 status, including the data resident thereon, at any given time up to the present. This may be particularly useful, for example, where a data block underwent an unintentional or malicious change, such as due to an accidental overwrite or corruption from a computer virus.

The first data structure employed by the embodiment is referred to as the "available block bitmap." The available block bitmap is essentially a bitmap of the available blocks in the disk. Each bit of the map represents the availability of a corresponding data block. As used herein, the term "block" refers to a logically contiguous sector (or series of sectors) of a hard disk or other storage device.

Figure 2:
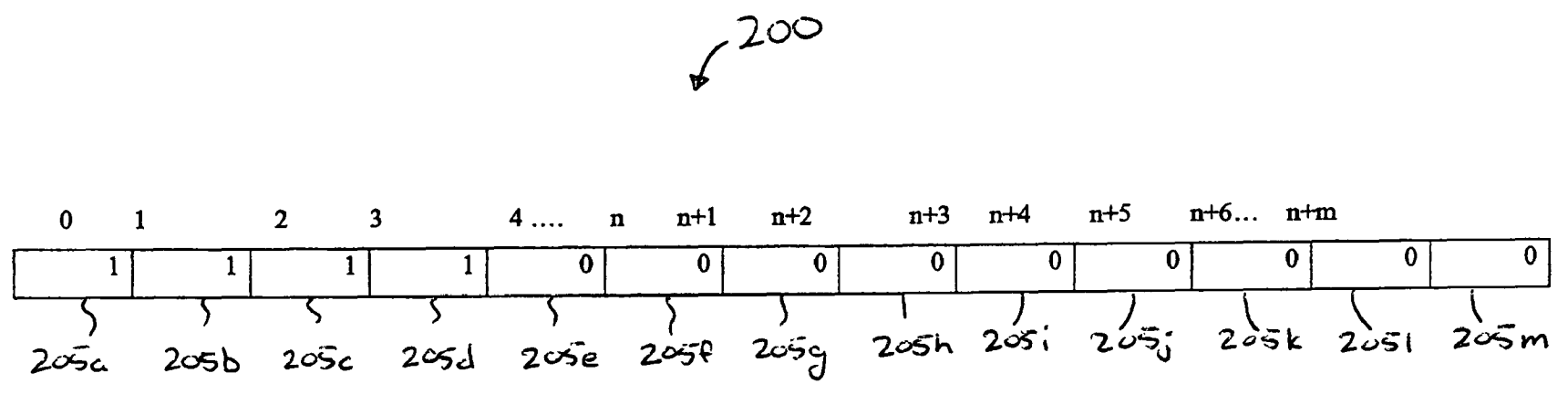

An example may assist in conceptualizing the available block bitmap. FIG. 2 depicts one implementation of the available block bitmap 200, as discussed in this example. Presume a storage device 135 includes 100 blocks of storage space. The corresponding available block bitmap 200 consists of 100 bits, with each bit 205a-205m representing a corresponding block. That is, Bit #0 205a may represent block #0, bit #1 205b may represent block #1, and so on.

Each bit 205a-205m is generally set to a first state to indicate a block of the storage device 135 is available for data to be written thereon, and a second state to indicate the block is unavailable. A block may be unavailable for writing if it already contains data. In the present embodiment, a bit 205 of the available block bitmap 200 is set to zero if the corresponding may accept data, and one if the corresponding block is unavailable for writing. Alternate embodiments may reverse this configuration.

The allocation of available blocks may now be discussed in some detail. Selection of an open block from the available block bitmap 200 may vary, depending on the selection algorithm employed. One exemplary selection algorithm is to select the next closest block to the right to the last allocated block (with respect to the view of the available block bitmap 200 shown in FIG. 2). Thus, the embodiment may write to sequential blocks of the storage device 135. A variable may point to the next block open block to permit the embodiment to determine where the next write operation occurs. For example, in the bitmap 200 shown in FIG. 2, presuming the last allocated block was #3, the next available block becomes #4.

Prior to the first write operation to a storage device 135, all entries in the bitmap 200 will be zero, since the storage device 135 contains no data. That is, the bitmap 200 will contain all zeros when the disk is newly available to the system for the first time. As storage blocks are occupied with data, the bits 205a-205m of the corresponding blocks in the bitmap 200 will be changed to ones. Continuing with the example, the available block bitmap 200 shown in FIG. 2 indicates the first four blocks of the disk contain data (and thus are unavailable for further writing), while the remaining blocks may be written to.

Typically, storage devices 120, 135 allocate storage space in terms of bytes and/or kilobytes. The size of the available block bitmap 200 may be determined by dividing the capacity of the storage device 135 by the minimum block size. For example, many commonly-available storage devices 120, 135 set the minimum size of a storage block at four kilobytes. Presuming a storage device 135 may hold 216 gigabytes of information, the available block bitmap 200 for the storage device 135 in this example would be 54 megabits, or nine megabytes, long.

Most storage devices 120, 135 employ a file system or an input/output ("I/O") system to keep track of the blocks at which particular data is stored. The exact implementation of the file or I/O system may vary between storage devices 120, 135, but each such system typically employs particular mapping algorithms to 1) logically view the storage device 135 as a collection of storage blocks for reading data therefrom and writing data thereto; and 2) mapping the physical structure of the storage device 135 to this logical view. As used herein, the term "host view block number" refers to the block number a file or I/O system (collectively, "file system") of a host assigns to a particular physical block of a storage device. It should be noted the host view block number may be different than the entry in an available block bitmap 200, or the physical block number of a storage device 135. Data written by the host to a particular logically-viewed block is typically rewritten by the host to the same logically-viewed block.

Figure 3:
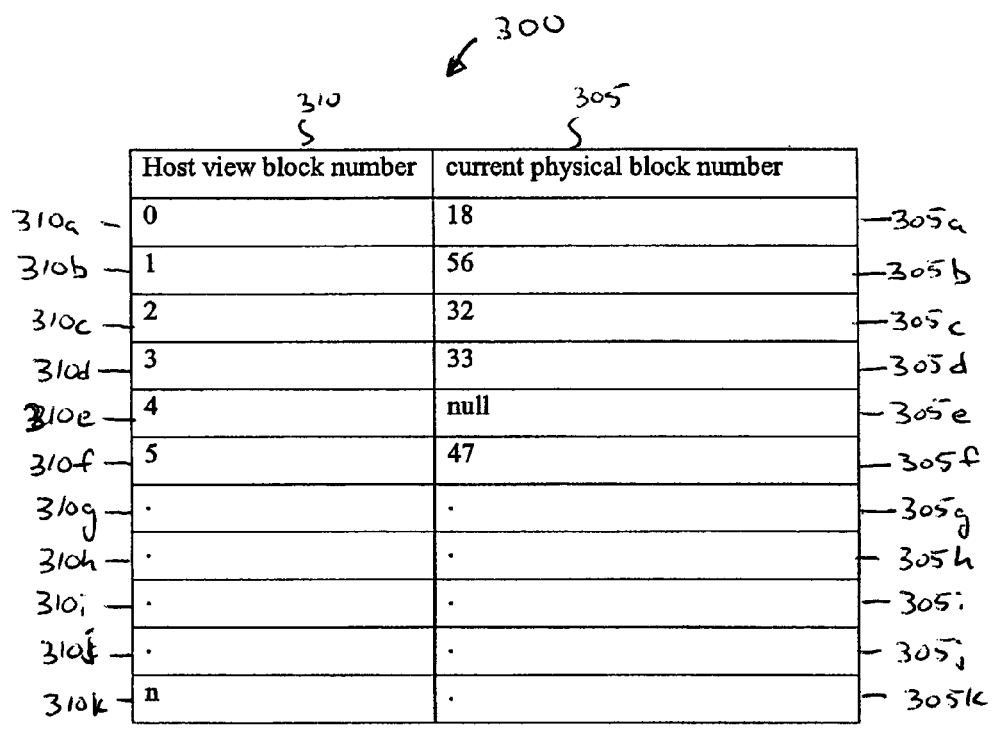
FIG. 3 depicts an exemplary current physical block table.

The present embodiment employs a "current physical block table" to track the relationship between the physical block number of a storage device and the corresponding host view block number. FIG. 3 depicts an exemplary current physical block table 300. Essentially, the current physical block table keeps a snapshot of the relationship between actual physical blocks 305a-305k and the host view blocks 310a-310k. Thus, the current physical block table 300 may be used to determine the actual physical blocks 305a-305k upon which data resides, as opposed to merely providing the logically-viewed blocks upon which data is resident.

In the example provided in FIG. 3, each entry of the first column of the current physical block table 300 contains a block number 310 that the file system views and/or assigns for the reading and writing of data to the storage device. The entries in the second column contain the physical block numbers 305a-305k corresponding to each host view block number 310a-310k. For example, data stored in host view block number zero 310a is actually stored in physical block number eighteen 305a of the storage device 135. Additionally, it should be noted that host view block number four 310d of the exemplary table has not yet had data written thereto. Accordingly, there is no corresponding physical block number 305d. Thus, the entry in the second column of the current physical block table 300 is "null."

Regardless of the number that the host's file system or disk I/O system assigns as the host view block number 310, the present embodiment allocates a new empty block every time data is written to the storage device 135, thus preventing any block from being overwritten. Returning to the above example, the actual physical block 305f of the host view block five 310f is forty-seven. This means data assigned by the logical view of the file system to block five 310f is located on block forty-seven 305f of the physical storage device 135. However, block five 305f of the logical host view may have been previously assigned to a completely different physical block at some prior point, and may be assigned to a different physical block at a future point.

The embodiment may also employ a third data structure to provide a data snapshot of a given time. The third data structure is generally referred to as a "time log," and works in conjunction with the available block bitmap and current physical block table to provide data snapshots.

FIG. 4 depicts an exemplary time log 400. The time log 400 generally maintains records 405a-405g of the time and date at which data was written to the storage device 135. In the present embodiment, the records 405a-405g are kept in chronological order, i.e., t1<t2<t3<t4<t5. Each record 405a-405g in the time log 400 includes at least four entries: a timestamp 410; a host view block number 415; a previous physical block number 420; and a current physical block number 425. The timestamp 410 indicates the time at which data was written to the storage device 135. The host view block number 415 indicates the logical block, as viewed by the host 145, to which data was written. The current physical block number 425 indicates the current physical block of the storage device 135 at which the data is stored. Finally, the previously physical block number 420 indicates the previous physical block of the storage device 135 at which the data was stored before the write operation in question. Each write operation generates a unique record in the time log 400.

Generally speaking, the timestamp 410 for each record 405a-405g may serve as a record identifier, or a separate identifier may be assigned to each record 405a-405g in the time log 400.

In the example shown in FIG. 4, data written to host view block one 415 at time t1 410 is stored at current physical block fifty-six 425. The data is stored in a new physical block, rather than being stored in the same block occupied prior to time t1 410 (i.e., physical block twenty-five 420), to avoid overwriting the older version of the data. At time t2 410, a second set of data is written to host view block five 415. This is the first time this second set of data is written to the storage device 135, since the entry in the "previous physical block" 420 column of the table for this write operation is "null."

Continuing the example, the data resident at host view block five 415 is rewritten to the storage device 135 at times t5 and t6 410 at physical blocks ninety-two and forty-seven 425, respectively. In a typical storage device/computing system employing a typical file system, the data would be rewritten to the same physical block of the storage device 135 at times t2, t5, and t6 410.

Since the embodiment does not rewrite data to the same physical block (only the same logical, or host-view block), old versions of data are never overwritten. Instead, each new version of any given data maintains the same host view block number 415, but is written to a different, open physical block. An "open" block is one that is available to accept data.

Figure 5:
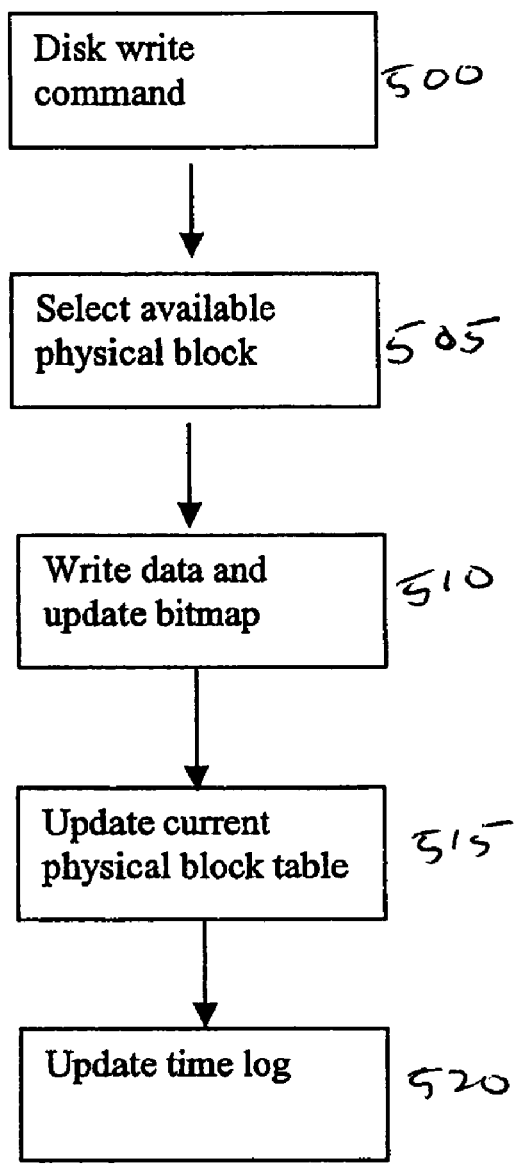
FIG. 5 is a flowchart depicting an exemplary write operation for the embodiment of FIGS. 2-4.

Having described the available block bitmap 200, current physical block table 300, and time log 400, the operation of the embodiment will now be discussed. FIG. 5 depicts an exemplary flowchart for a write operation in accordance with the present embodiment.

Initially, a command to write data 500 to the storage device 135 is received from the file system in operation 500. The write command will generally include the host view block number to which data is to be written, as specified by the host and/or file system.

Next, in operation 505, the embodiment may select an open block from the available block bitmap 200. Some embodiments allocate the open block nearest the physical beginning of the storage device 135, in order to minimize fragmentation of the storage device 135. Yet other embodiments may select the smallest contiguous set of blocks that may accept the entirety of the data, to minimize data fragmentation. Still other embodiments may employ other selection algorithms. Regardless, once the open block is selected by the embodiment, data is written to the selected block in operation 510.

Following (or concurrently with) data being written to the physical block of the storage device 135 in operation 510, the available block bitmap 200 is updated to ensure the physical block of the storage device 135 to which data is written is flagged as "unavailable." Next, in operation 515, the embodiment updates the current physical block table 300 to indicate the physical block 305 corresponding to the host view block 310. Finally in operation 820, a new record 405 is generated 520 in the time log 400, indicating the time 410 the write operation occurred, the host view block 415 to which data was written, the prior physical block 420 corresponding to the host view block 415, and the current physical block 425 corresponding to the host view block 415.

It should be noted that, upon receiving the disk write command in operation 500, the current physical block 305 from the current physical block table 300 is retrieved and is added to the present record 405 of the time log 400 as the previous physical block 420. This typically occurs upon completion of the actual data write operation. It should also be noted that the update of the available block bitmap 200, current physical block table 300, and time log 400 may occur in any order after the write operation.

The present embodiment is particularly suited to providing a snapshot of a disk's state, and the corresponding data, at a prior time. This is colloquially referred to as "rolling back" a storage device 135. To roll back a storage device 135, the embodiment updates the current physical block table 300 so that the current physical block number 305 for each host view block 310 matches the current physical block number 425 identified in the time log 400 for the time 410 to which the device 135 is rolled back. An example may illustrate this operation.

Consider the various data structures of FIGS. 2-4. Presume the storage device 135 is to be rolled back to time t1 410. Such a rollback effectively undoes the write operations occurring after t1. Accordingly, the current physical block table 300 is updated to reflect the snapshot at time t1. In this example, three host view blocks 310 must be rolled back, namely host view blocks two, three, and five 310c, 310d, 310f. (Host view block one 310b was last written at time t1 410, and thus remains untouched by the embodiment.) The host view blocks two, three, and five 310c, 310d, 310f may be reset to point to the physical blocks seventy-two, seventy-seven, and null, respectively, restoring the status of these host view blocks 310c, 310, 310f at time t1 410. This may be accomplished because the present embodiment does not overwrite any written-to physical blocks, as discussed above.

The embodiment may employ the time log 400 to determine the proper physical block numbers for any time by going chronologically backward through the records 405a-405g in the time log 400, and setting the value of the "current physical block number" 305 column of the current physical block table 300 equal to the value of the "previous physical block" 420 column of the time log 400 for the host view block 415 in the record 405. This process continues for each record 405a-405g until the rollback time is reached.

Accordingly, the embodiment would perform the following operations to roll back from time t6 410 to time t1 410:

1. Set the current physical block number 305*f* to 92 for host view block five 310*f* in the current physical block table 300 (corresponding to record t6 405*f*);

2. Set the current physical block number 305*f* to 91 for host view block five 310*f* in the current physical block table 300 (corresponding to record t5 405*e*);

3. Set the current physical block number 305*f* to 77 for host view block three 310*f* in the current physical block table 300 (corresponding to record t4 405*d*);

4. Set the current physical block number 305*c* to 72 for host view block two 310*c* in the current physical block table 300 (corresponding to record t3 405*c*);

5. Set the current physical block number 305*f* to NULL for host view block five 310*f* in the current physical block table 300 (corresponding to record t2 405*b*); and 6. Stop at the record 405*a* having timestamp t1 410 in the time log 400 (corresponding to record t1 405*a*).

An alternate embodiment may scan the time log 400 from time t1 410 forward until the earliest record for each host view block 415 is found, and set the current physical block 305 for each host view block 310 equal to the previous physical block 420 value for the earliest record 405 corresponding to each host view block 415. In such an embodiment, the following operations may occur:

1. Set the current physical block number 305*b* to 25 for host view block one 310*b* in the current physical block table 300 (corresponding to record t1 405*a*);

2. Set the current physical block number 305*f* to "NULL" for host view block five 310*f* in the current physical block table 300 (corresponding to record t2 405*b*);

3. Set the current physical block number 305*c* to 72 for host view block two 310*c* in the current physical block table 300 (corresponding to record t3 405*c*);

4. Set the current physical block number 305*d* to seventy-seven for host view block three 310*d* in the current physical block table 300 (corresponding to record t4 405*d*);

5. Ignore the record 405*e* having timestamp t5 410, since the current physical block table 300 has been previously reset for host view block five 310*f* (corresponding to record t5 405*e*); and 6. Again ignore the record 405*f* having timestamp t6 410, since the current physical block table 300 has been previously reset for host view block five 305*f* (corresponding to record t6 405*f*).

It should be noted that only the current physical block table 300 is updated, leaving the bitmap 200 and the time log 400 intact. In the foregoing example, if the embodiment rolls backward to time 410 of t1, all the physical blocks written after t1 cannot be accessed. However, this does not cause storage leakage, since the snapshot of the storage device 135 at time t1 410 is accurate and all data is properly located for that time. Further, blocks storing versions of data written after the rollback time may be retrieved as necessary during a roll forward operation, because the time log table 400 contains all the necessary information on those blocks.

In addition to rolling backward, the present embodiment may also roll forward through the time log 400 to provide a snapshot of data. For example, after rolling backward to time t1 410, as discussed above, the embodiment may roll forward from time t1 410 to time t5 410. To perform a roll forward, the embodiment analyzes each record 405 *a*-405*g* in the time log 400 from the time reflected by the storage device 135 (here, t1) until the record corresponding to the desired time 410 is reached (here, t5). As the embodiment analyzes a given time record 405*a*-405*g*, it updates the current physical block number 305 of the current physical block table 300, for the host 415 listed in the record 405, with the value in the "current physical block number" 425 column of the record 405. That is, when a record 405 is accessed, the embodiment determines the corresponding host view block 415 and current physical block 425 for that record 405. The embodiment then finds the entry in the current physical block table 425 corresponding to the corresponding host view block 415, and copies the value from the time log 400 record's "current physical block" 425 column to the current physical block table 300 entry for the host view block 310. Effectively, the embodiment reprocesses each record 405*a*-405*g* occurring from the time the storage device 135 shows (the "disk time") to the roll forward time.

As an example, refer again to the data structures of FIGS. 2-4. Presume the storage device 135 currently reflects time t1 410, and the embodiment wishes to roll forward to time t5 410. The following operations would occur:

1. The current physical block number entry 305*f* in the current physical block table 300 corresponding to host view block five 310*f* would be set to ninety-one (corresponding to the write operation at time t2 410);

2. The current physical block number entry 305*c* in the current physical block table 300 corresponding to host view block two 310*c* would be set to thirty-two (corresponding to the write operation at time t3 410);

3. The current physical block number entry 305*d* in the current physical block table 300 corresponding to host view block three 310*d* would be set to thirty-three (corresponding to the write operation at time t4 410); and 4. The current physical block number entry 305*f* in the current physical block table 300 corresponding to host view block five 310*f* would be set to ninety-two (corresponding to the write operation at time t5 410).

Note that the embodiment does not process record t1 405*a* during the roll forward, since the storage device 135 already reflects the data status as of that time. Once again, the bitmap 200 and time log 400 remain unaltered, permitting future rollback and/or roll forward operations.

The entirety of the storage device's 135 capacity will eventually be consumed as the disk is being used over time, since the embodiment does not generally reallocate used blocks. When insufficient storage capacity remains for a write operation, the embodiment returns some physical blocks containing old data to the pool of available physical blocks.

Certain data may be corrupted by a virus, write error, and so forth. Blocks containing corrupt data may be returned to the pool of available blocks by setting the corresponding bits 205 in the bitmap 200 to zero, thus making them available for future use.

However, during this process consistency between the bitmap and time log tables 200, 400 must be maintained. When a physical block is returned to the pool of available blocks, the corresponding entries in the time log table 400 should reflect the fact that the block is no longer available to store old data. Such consistency can be maintained in the time log table 400 by adding an extra column to the time log 400.

Returning to FIG. 4, the time log 400 may be provided with an additional column. This column is shown in FIG. 4 under the header "R" (for "reuse") 430. Blocks may be flagged for reuse by setting a bit in the corresponding record 405 to one in the reuse 430 column. (In alternate embodiments, the bit may be set to zero). If a record's reuse 430 column is flagged, then the physical block disclosed in the record's 405 "current physical block number" 425 column may not contain the data corresponding to the host view block at the record time. Instead, this data may be overwritten.

Returning used blocks to the pool of available blocks and maintaining consistency between available blocks (as represented in the bitmap 200) and the time log table 400 is relatively straightforward, once the invention is appreciated. However, actual selection of candidate blocks to be returned to the pool of available blocks may vary between embodiments. Different embodiments may employ different strategies or policies to determine the order in which blocks are released into the pool of available blocks. Release of blocks into the pool of available blocks also updates the available block bitmap 200 to reflect the released blocks' new status.

As one example, when a block is infected by a virus, the embodiment may return the block to the pool. Infection may be detected, for example, when retrieval of data from the block fails.

As another example, all blocks corresponding to records 405a-405g accessed during a rollback operation may be released into the pool of available blocks. Simply releasing these blocks does not necessarily mean the data stored on them is unavailable in the event of a roll-forward. Rather, such data is available until the block is actually reassigned and overwritten. Accordingly, an embodiment employing this strategy for release of blocks may track when such released blocks are reassigned and overwritten.

Similarly, the time log 400 also continues to grow with each write operation, thus occupying an ever-greater portion of the storage device's 135 capacity. At some point, it may prove advantageous to return at least a portion of the storage capacity occupied by the time log 400 to the storage device 135. The time log 400 may be truncated, and sufficiently old records 405a-405g deleted.

It should be noted that the deletion of old records 405a-405g to truncate the time log 400 may also free blocks for reuse. Once a record 405 is removed from the time log 400, the corresponding blocks in the "previous physical block number" 420 and "current physical block number" 425 columns may be released into the pool of available blocks. Continuing the example, suppose the entries from t1 to t4 of the time log 400 (shown in FIG. 3) are truncated. The resulting time log 400 is shown in FIG. 6.

Since the records 405a-405d have been purged from the time logs 400, the corresponding previous physical blocks 420 can no longer be accessed and data may not be retrieved therefrom. Accordingly, these previous physical blocks 420 (i.e., physical blocks 25, 72, and 77) may be returned to the pool of available blocks and the available block bitmap 200 updated accordingly.

The three data structures discussed with respect to the present embodiment may be stored outside the ordinary partition of a storage device 135. For example, these data structures may be stored in a separate secondary storage device to speed up input/output operations of a primary storage device 135 (i.e., the storage device actually storing data). A device controller 600 may be used to implement such a segmentation, as shown in FIG. 7.

Figure 7:
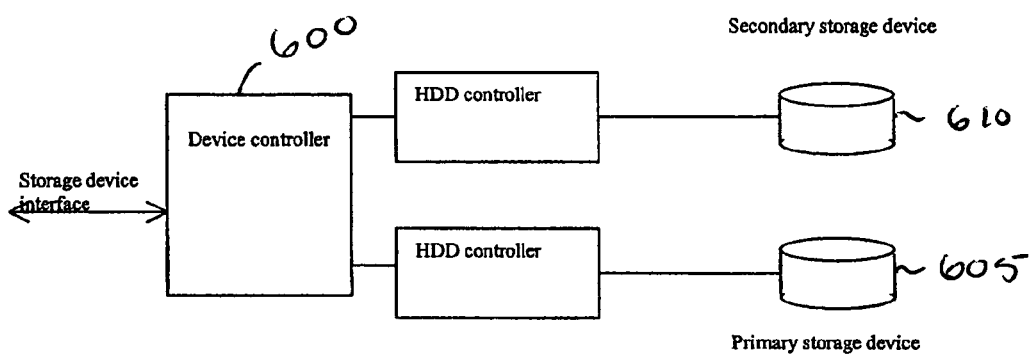
FIG. 7 depicts an embodiment of the present invention employing a primary and secondary storage device remotely located from a host.

The primary storage device 605 shown in FIG. 7 may contain the data and metadata of a specific file system, written as discussed herein. The secondary storage device 610 may contain the various data structures herein described. The device controller 600 may issue commands to the secondary storage device 610 to facilitate the look-up and update of the three data structures concurrently with storage device commands issued to the primary storage device 605 to access data stored thereon. This segmentation of data structures and data storage may expedite reading and writing operations of the embodiment.

Figure 8:
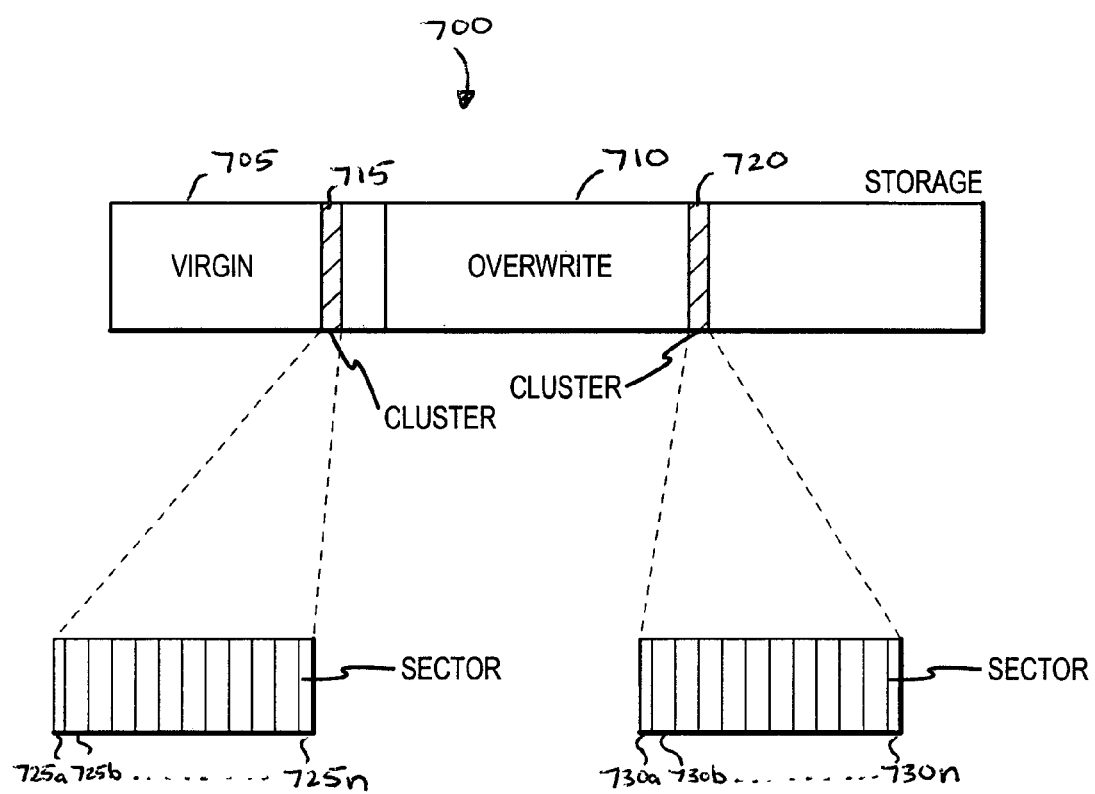
FIG. 8 depicts a logical view of a storage device.

A second embodiment of the present invention generally divides at least a portion of a disk 700 (or other storage device, including those described above) into a virgin area 705 and a rewrite area 710, as shown in FIG. 8. Each area consists of multiple clusters 715, 720, and each such cluster 715, 720 consists of multiple sectors 725a-725n, 730a-730n. It should be understood that the number of sectors 725a-725n, 730-730n may vary from one embodiment to another. Accordingly, sectors 725n and 730n represent generic end sectors, and do not imply a particular number of sectors per cluster. Data may be written to the sectors 725a-725n, 730a-725n by the embodiment. It should be understood the view shown in FIG. 8 (and consequently in FIG. 10) of a storage device 700 is a logical representation, rather than a physical one. Accordingly, the view is used for illustrative purposes only.

Figure 9:
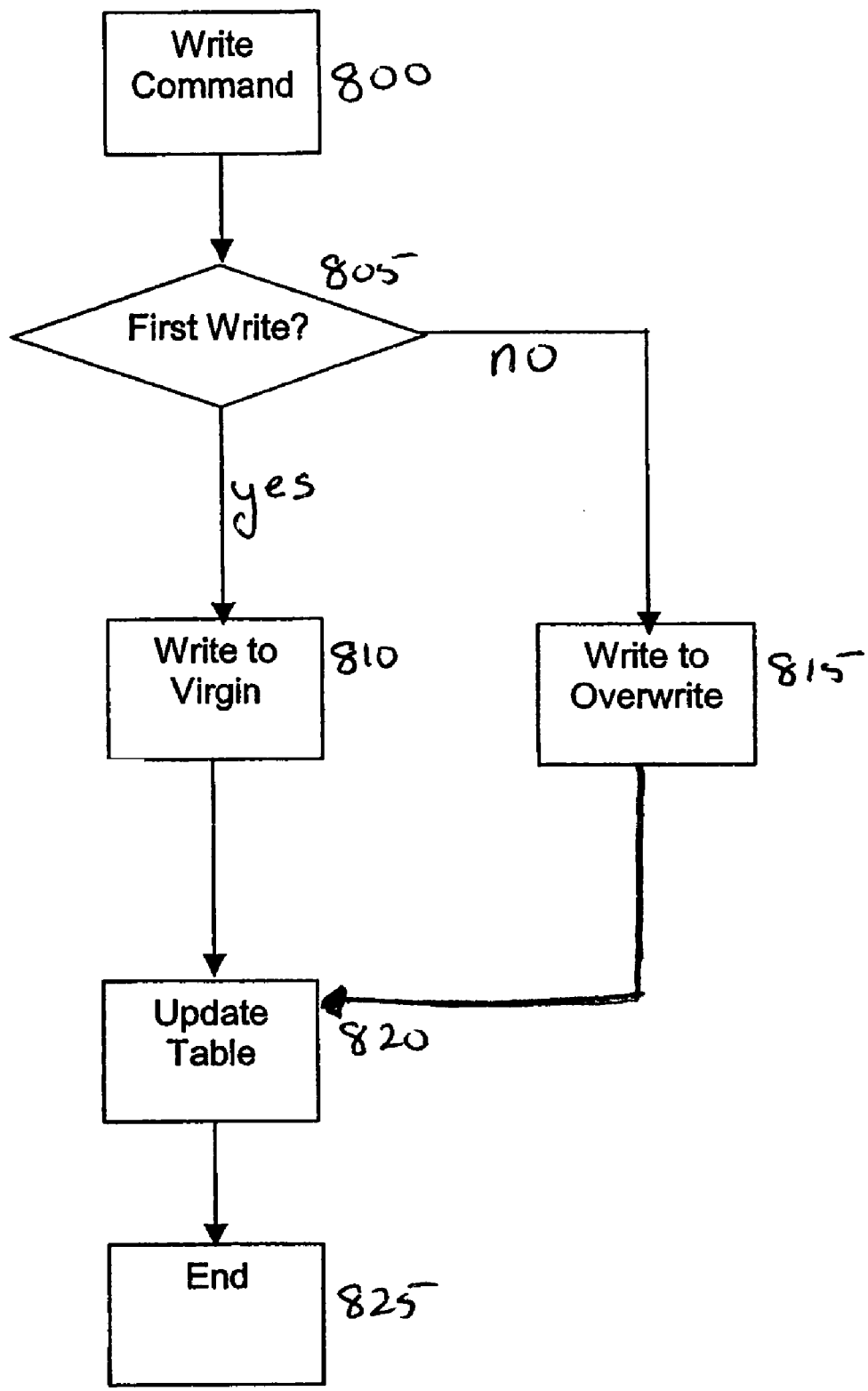
FIG. 9 is a flowchart generally depicting a write operation for one embodiment of the present invention.

The general write operation of the embodiment is depicted in the flowchart of FIG. 9. In operation 800, when the embodiment receives a command to write data to the storage device 700, the embodiment first determines in operation 805 if the data (or more generally, the file containing the data) has been written to a block of the storage device 700 previously. The embodiment may employ, for example, a look-up table (discussed in more detail below) to determine if the data has been previously written. If the write operation is the first write operation for the given data, the data is recorded in the virgin area 705 of the storage device 700 in operation 810. If, however, the data has been previously written to the storage device 700, the data is recorded instead in the overwrite section 710 in operation 815.

The term "data" is used generally herein to denote not only the particular data in question or being discussed, but also the structure containing the data and metadata associated with the data. For example, a block might contain data corresponding to a word processing document. As the document is revised, the data changes, but the block (i.e., the structure containing the data) maintains certain metadata, such as the block name. When the changed document is saved, the data is updated to reflect these changes but the block name and certain metadata are not necessarily changed. Thus, the embodiment typically analyzes the metadata or structure to determine whether the associated data has been previously written to the storage device in a prior iteration.

Regardless of whether or not the write to the storage device 700 is to the virgin or overwrite areas 705, 710, the embodiment, in operation 820, then updates the look-up table (or other means of keeping track of block locations) with the location of the data. Typically, the location takes the form of a disk address, such as a specific cluster and sector. Some embodiments of the present invention may include an additional field or bit in the address identifying whether the data location is in the virgin or overwrite areas 705, 710.

Typically, writing of data occurs sequentially on the storage device or disk 700. That is, sectors 725a-725n, 730a-730n and clusters 715, 720 are generally logically filled in a chronological order. Thus, returning to the logical illustration in FIG. 8, both the virgin and overwrite areas 705, 710 would be written with new data from left to right. In alternate embodiments, data writing may occur to any non-allocated sector 725, 730 or cluster 715, 720 within the appropriate area.

Figure 10:
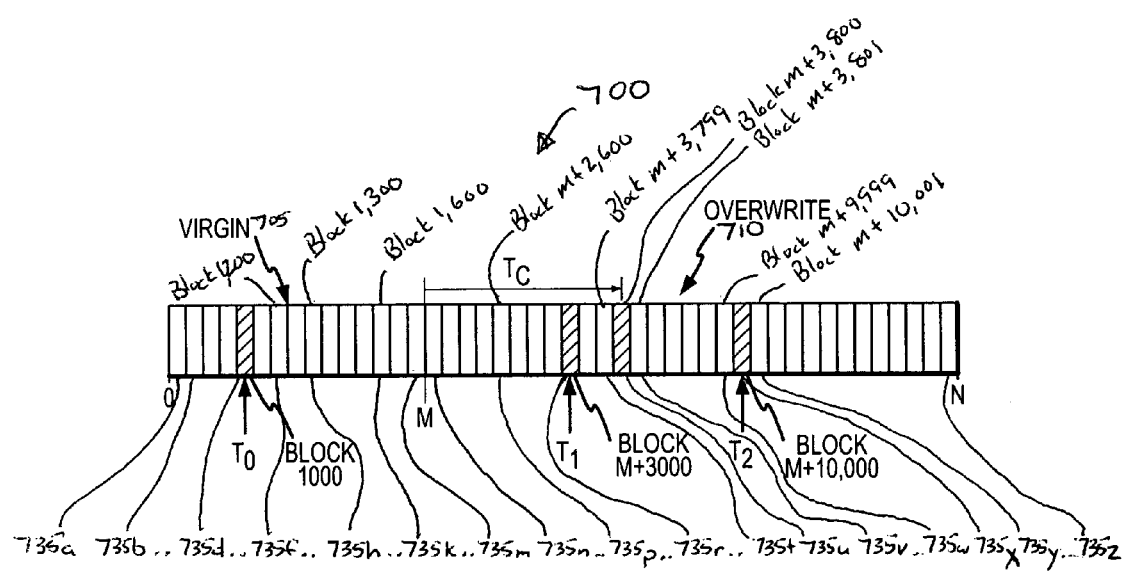
FIG. 10 depicts a logical view of a storage device, in accordance with the embodiment of FIG. 9.
Figure 11:
FIG. 11 depicts a look-up table in accordance with the embodiment of FIG. 9.

FIGS. 10 and 11, taken together, serve to illustrate the write operation of the embodiment. Initially, presume a storage device 700 is divided into two sections, the aforementioned virgin and overwrite areas 705, 710. The virgin area 705 extends from block zero 735a to block M 735m, while the overwrite area 710 extends from block M+1 735n to block N 735z. It should be understood that the number of blocks 735a-735m, 735n-735z may vary from one embodiment to another. Accordingly, blocks 735*m* and 735*z* represent generic end blocks, and do not imply a particular number of blocks per virgin area or overwrite area 705, 710, respectively.

A first data (block 1) is initially written at a specific time (T0) to the storage device 700. Since T0 is the first write operation for block 1, block 1 is stored in the virgin segment 705 of the storage device/disk 700. In the present example, block 1 is written to block one thousand 735*d* of the virgin area 705. As used herein, the term "block" denotes a generic data storage segment, such as a cluster 725*a*-725*n*, 730*a*-730*n* or sector 715, 720, appropriate to the storage device 700 being used.

Once the data is written to the storage device 700, the embodiment creates an entry in the table 1000. The entry generally includes a timestamp 1010 setting out the time and date at which the write operation took place, an identifier 1020 of the block 735*a*-735*z* to which the data was written, and an identifier 1030 of the data itself (in this case, "Block 1"). Some embodiments may also include a flag indicating whether the write operation occurred in the virgin or overwrite areas 705, 710. This may, for example, speed data retrieval by permitting the storage device 700 to seek the block 735*d* within a smaller segment of blocks 735*a*-735*m*. Further, the flag may provide a quicker response if a host queries the table 1000 to determine whether data was written in the virgin or overwrite areas 705, 710.

Next, block 2 is written for the first time to block one thousand six hundred 735*k* of the virgin area 705 at a particular time. As with the first write of block 1, the timestamp 1010, block written to identifier 1020, and block data identifier 1030 are all stored in the table 1000.

At yet another time, block 2 is rewritten to the disk 700. The embodiment may check the table 1000 and determine block 2 was previously written to the virgin area 705. Accordingly, the present write operation takes place in the overwritten area 710, and in this example occurs at block M+2600 735*p*. Similarly, block 1 is written to the disk's 700 overwrite area 710 twice more, once at time T1 at block M+3000 735*r* and again at time T2 at block M+10,000 735*x*. As these writes take place, other writes may also occur in the overwrite area 710. Additionally, the first write operation for any other data will continue to occur in the virgin area 705.

It should be noted with respect to FIG. 11 that the present embodiment keeps a unique record 1040*a*-1040*f* for each write iteration of data. That is, every time data is written to the storage device 700, a record 1040 is created. Accordingly, a single block may have multiple entries, each reflecting a different write operation for the block.

At some point, the overwrite area 710 will fill with written data. When this occurs, the embodiment writes over the data stored in the overwrite area 710, beginning with the chronologically oldest data stored therein. In other words, and with respect to the views of FIGS. 8 and 10, the embodiment begins overwriting data on the leftmost side of the overwrite area 710, proceeding towards the right. Some embodiments may check the entry in the table 1000 for a given data prior to overwriting. If the entry indicates the data in question is the last (or latest) write for that particular data, the embodiment will instead skip the data and overwrite the next oldest data, in chronological order. In this manner, the embodiment may prevent overwriting the most recent iteration of any given data.

Continuing with the example of FIGS. 10 and 11, at time TC, which occurs later than time T2, the embodiment has filled the overwrite region 710 and begun writing over old data. Thus, at time TC, the embodiment writes the latest iteration of block 1 to block M+3800 735*u*. Further, at time TC blocks M+1 to M+3799 735*n*, 735*t* of the overwrite region 710 have been written over. Thus, the chronological order of data stored in the overwrite region 710 runs from block M+3801 (oldest) 735*v* to block N 735*z*, and wraps around from block M+1 735*n* to block M+3800 (newest) 735*u*. This presumes no data in blocks 1-3799 is the most recent copy of that data.

Similar procedures may occur in the virgin area 705. Once the virgin area 705 fills to block M 735*m*, the embodiment may begin overwriting the virgin area 705 from block zero 735*a*. Alternately, the embodiment may repartition the virgin and overwrite areas 705, 710, allocating additional space to the virgin area 705 from the overwrite area 710. As yet another option, the embodiment may create additional virgin write space on a second storage device.

It is anticipated that filling the virgin area 705 would take a significant period of time, insofar as each block is written only once to the virgin area 705. If even 10% of a 100 gigabyte (GB) disk is devoted to a virgin area 705, the virgin area 705 can hold 10 GB of unique data written for the first time. Additionally, certain embodiments may filter the data written to the virgin area 705 to prevent non-critical data from being written therein. For example, some embodiments may prevent certain operating system files, such as swap files or temporary files, or disk caches, from being written into the virgin area 705. Alternate embodiments may write only blocks of up to a maximum size into the virgin area 705, or only blocks of certain types (for example, having certain extensions). In this manner, the virgin area 705 may be reserved for specific blocks or data, which in turn may optimize use of the virgin area 705. In yet other embodiments, a user may be able to specify which blocks or data, or types of data or blocks, are written into the virgin area 705.

Since the embodiment tracks each write of a block/data to a storage device 700, the embodiment may determine not only the present location of the most recent block/data iteration, but also the location on the storage device 700 of the block/data at any prior time. This may prove especially useful, for example, in recovering data lost due to a computer virus, malicious attack on or deletion of data, or software crash. The present embodiment may easily retrieve the last version of a block or data known to be error-free in the following manner.

In the event a virus corrupts blocks or data, or data is otherwise damaged, a restore time may be determined. The restore time is the time from which data/blocks are to be restored, and generally is the point at which blocks were last known to be uncorrupted. The embodiment may pick a specific time (for example, three days earlier), data or the operating system's file system may be analyzed to determine the time at which data was corrupted and roll back before that tie, or the user may specify a time. In any event, once the restore time is known, the embodiment may restore the last version of the block or data stored on or prior to the restore date.

The embodiment may begin with the record having the timestamp 1010 closest, but equal or prior, to the restore date. The embodiment may proceed chronologically backward through the records 1040*a*-1040*f* in the table 1000, restoring each block or data in turn. Once an iteration of a block or data has been restored, chronologically earlier versions of that block or data are ignored.

The invention may restore the data or block in a variety of ways, several of which will be discussed in turn.

In the present embodiment, the look-up table 1000 may be scanned until a record having a timestamp 1010 earlier than, or equal to, the restore time is identified for each block or data.

Again, the embodiment typically identifies or flags only the chronologically most recent record for each block during this operation.

Once a record 1040a-1040f is identified for each block in the table 1000 and/or overwrite area 710, the data stored in the blocks corresponding to that record may be copied into the virgin area 705. The table 1000 may then be populated with a new series of records 1040 indicating the most recent write for the blocks/data in question occurred in the virgin area 705. Such records 1040 are formatted in the same manner as discloser earlier herein. That is, the records 1040 will indicate the time the write to the virgin area 705 occurred, the blocks in which the data is recorded, and the identifier for each block/data. In some embodiments, a flag may be set to indicate the data is recorded in the virgin area 705.

An example may assist in understanding this concept. Returning to FIG. 10, presume at time TC it is discovered that a virus corrupted certain data and/or blocks. Further presume the last known uncorrupted data version occurred at time T2. Accordingly, the restore time would be time T2. The embodiment would scan the table 1000 of FIG. 11, looking for records having a timestamp 1010 equal to or predating time T2 for each block. The embodiment would then copy the corresponding data to the virgin area 705. Presume block 1 is copied to block one thousand two hundred 735f of the virgin area 705, and block 2 to block one thousand three hundred 735h of the virgin area 705.

Figure 12A:
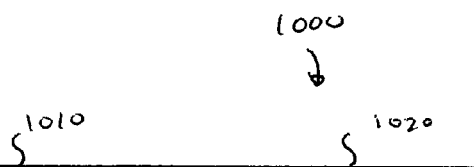
FIG. 12A depicts the look-up table of FIG. 11, after a restore operation is completed.

After copying, the embodiment may generate new records 1040g-1040h indicating the time and write location of the blocks to the virgin area 705, as shown in FIG. 12A. The embodiment may further erase the overwrite area 710 up to time T2, since the most recent version of each block prior to time T2 is now resident in the virgin area 705. In the present example, block M+3801 to M+9,999 735v, 735w would be erased (since blocks M+1 to M+3800 735n, 735u have been overwritten by the embodiment with chronologically later data).

Further, since the virgin area 705 now contains clean records 1040g-1040h as of the restore time (T2, in the example of FIGS. 10 and 11), the overwrite area 710 may be erased from the restore time forward to eliminate corrupted versions of data/blocks. In the example given with respect to FIGS. 10 and 11, blocks M+1 to M+3800 735n, 735u would be erased, as would block M+10,001 to N 735y, 735z.

In still another embodiment, the entire overwrite area 710 may be erased, since blocks occurring after time T2 (the restore time) may be corrupt, and the latest version of each block prior to time T2 is resident in the virgin area 705.

Still another embodiment may operate as just described, but each record in the table may include an additional timestamp indicating the last time at which the block in question was written to the virgin area 705. FIG. 13 depicts such a table 1100. When the embodiment copies the record to the virgin area 705, all the records for that particular block/data may be updated to reflect the writing of the most recent, clean version of the block to the virgin area 705.

Figure 12B:
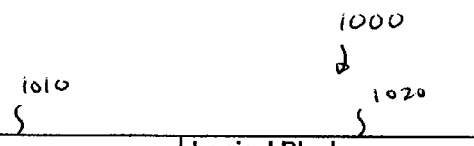
FIG. 12B depicts an alternate embodiment of the look-up table of FIG. 12A.

In a different embodiment, the table 1000 may simply be truncated and all records 1040a-f created on a date later than the restore deleted. In such an embodiment, the various file pointers would be updated to point to the location of the most recent record for each block remaining after table truncation. This is shown, for example, in FIG. 12B.

In yet another embodiment, the embodiment may scan chronologically backwards from the restore date. As the first record 1040 for each unique block or data is encountered, that record 1040 may be duplicated in the table 1000 with a timestamp 1010 equal to the time of duplication. Essentially, a new record 1040 is created in the table 1000 for each block with a timestamp 1010 equal to the time and date at which the restore operation commenced, or alternately at the time the old record 1040 was identified by the embodiment during the restore operation.

In still another embodiment, the latest record 1040 for each block or data that is nonetheless chronologically prior to the restore date may be updated with a new timestamp 1010 reflecting the time of the restore operation (or the time at which the record 1040 was identified).

In a further embodiment, the embodiment may locate the version of the block corresponding to the record 1040 closest in time, but prior to, to the restore date. The embodiment may then copy the block from the block(s) specified in that record to the block(s) specified in the latest record for that block. In this manner, no table entries are changed, but the uncorrupted blocks nonetheless replace corrupted ones. It may be advantageous to include a field for each record 1040 corresponding to such an updated block pointing back to the original record 1040 corresponding to the block from which data is copied.

Other methods for restoring data, files, and/or and blocks will occur to those skilled in the art upon reading the present description of the embodiment's operation and the implementation of the look-up table.

The look-up table may be loaded into the memory of the host to permit quicker operation during a read or write operation from or to the storage device.

Figure 14:
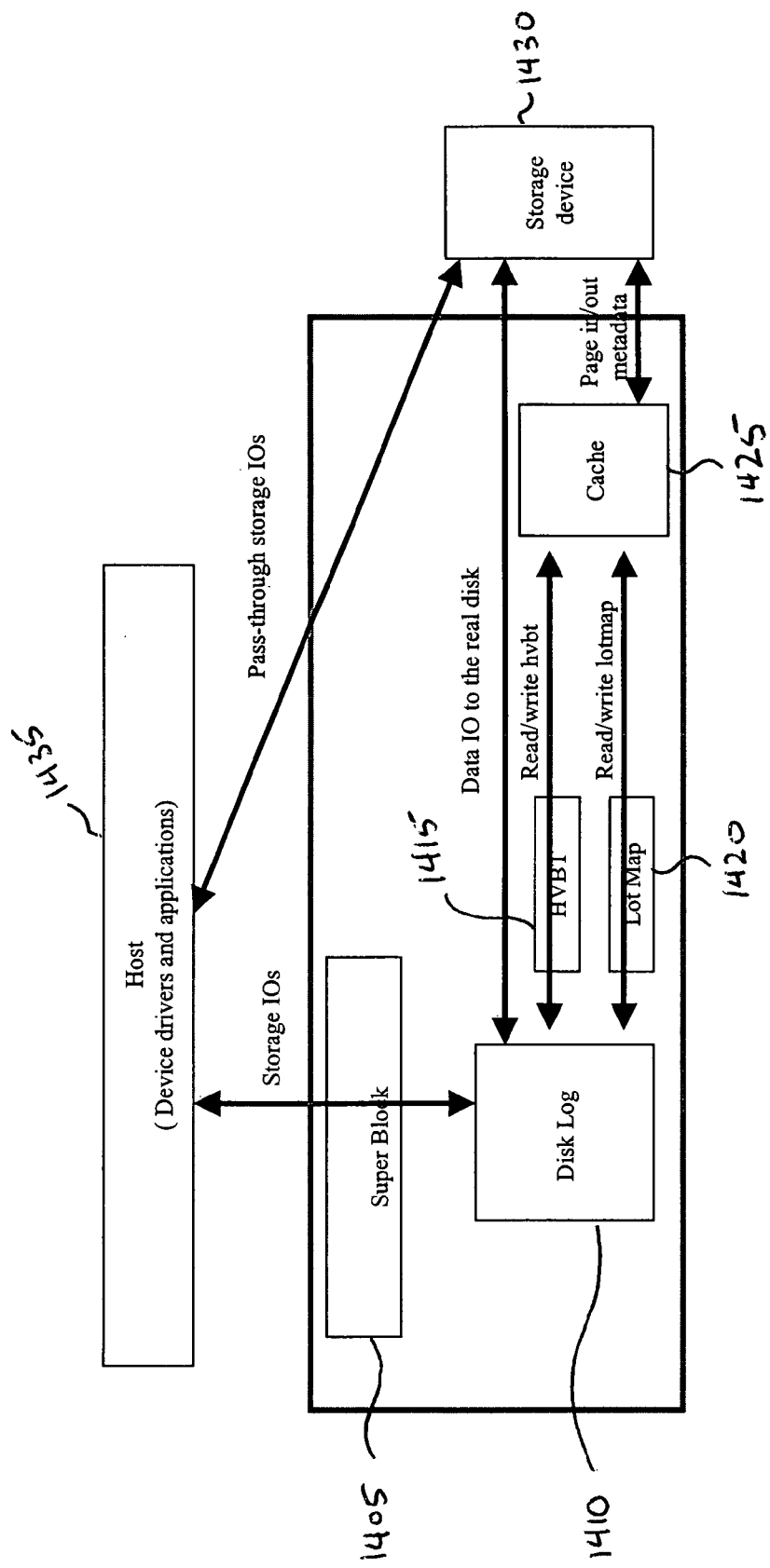
FIG. 14 depicts a third embodiment of the present invention.

A third exemplary embodiment of the present invention is depicted in FIG. 14. The third embodiment may include, among other elements, a super block 1405, a disk log 1410, a host view block table ("HVBT") 1415, a lot map 1420, and a cache 1425. The super block 1405 points to the locations where necessary information for the embodiment to write, read, access, audit, and recover data is stored. The disk log 1410 contains logs, as described in more detail below, for data written to the storage device using the embodiment. The HVBT 1415, which is similar to the "current physical block" table 300 previously described with reference to first embodiment, tracks the relationship between the physical block number of the storage device 1430 and the corresponding host view block number. The lot map 1420, which is similar to the "available bit map" 200 previously described with reference to the first embodiment, tracks the number of blocks used in a lot and the availability of a lot for data storage. As used herein, a "lot" refers to a collection of blocks. Each block is a unit of data storage. A block may be, for example, one bit, one byte, or other length.

Software, hardware and other drivers and applications ("hosts") 1435 that issue I/O requests may communicate with, and receive communications from, the embodiment and any associated storage devices 1430. Some host 1435 I/O requests may be pass-through writes to the storage device 1430, which generally means the write does not require block address mapping. Such pass-through writes will generally not require various read and write operations between the various elements of the embodiment. Other host I/O requests will result in various read and write operations between elements of the embodiment, the storage device 1430, and the host 1435. For example, a host 1435 may issue an I/O request to the embodiment to write some data to the storage device 1430. Upon receiving the write data request, the embodiment may read and write logs from and to the disk log 1410, the HVBT 1415, the lot map 1420, and the storage device 1430. Continuing with the example, the embodiment may write the data to the storage device 1430. Prior to writing the data to the storage device 1430, the embodiment may read the lot map 1420 to determine the next available lot for storage on the storage device 1430. When the embodiment writes the data to the next available lot, the embodiment may update the lot map 1420 to indicate that the lot is no longer available. During this write operation, the embodiment may update the disk log 1410 to contain information about the write operation such as start and end time of the write operation. The embodiment may also read the HVBT 1415 to determine where any data overwritten by the host's 1435 write request was previously stored on the storage device 1430 and write this information into a log in the disk log 1410. The embodiment may further update the HVBT 1415 to indicate the physical addresses/blocks where the data from the write request was stored. Various ways to the embodiment may interact with the host 1435 and the storage device 1430 will be described in more detail below. Further, as previously described above for other embodiments, the various tables and other data structures and algorithms of the third embodiment may be located on one or more separate storage devices, chips embedded on the storage device, control cards, or other hardware devices.

Figure 15:
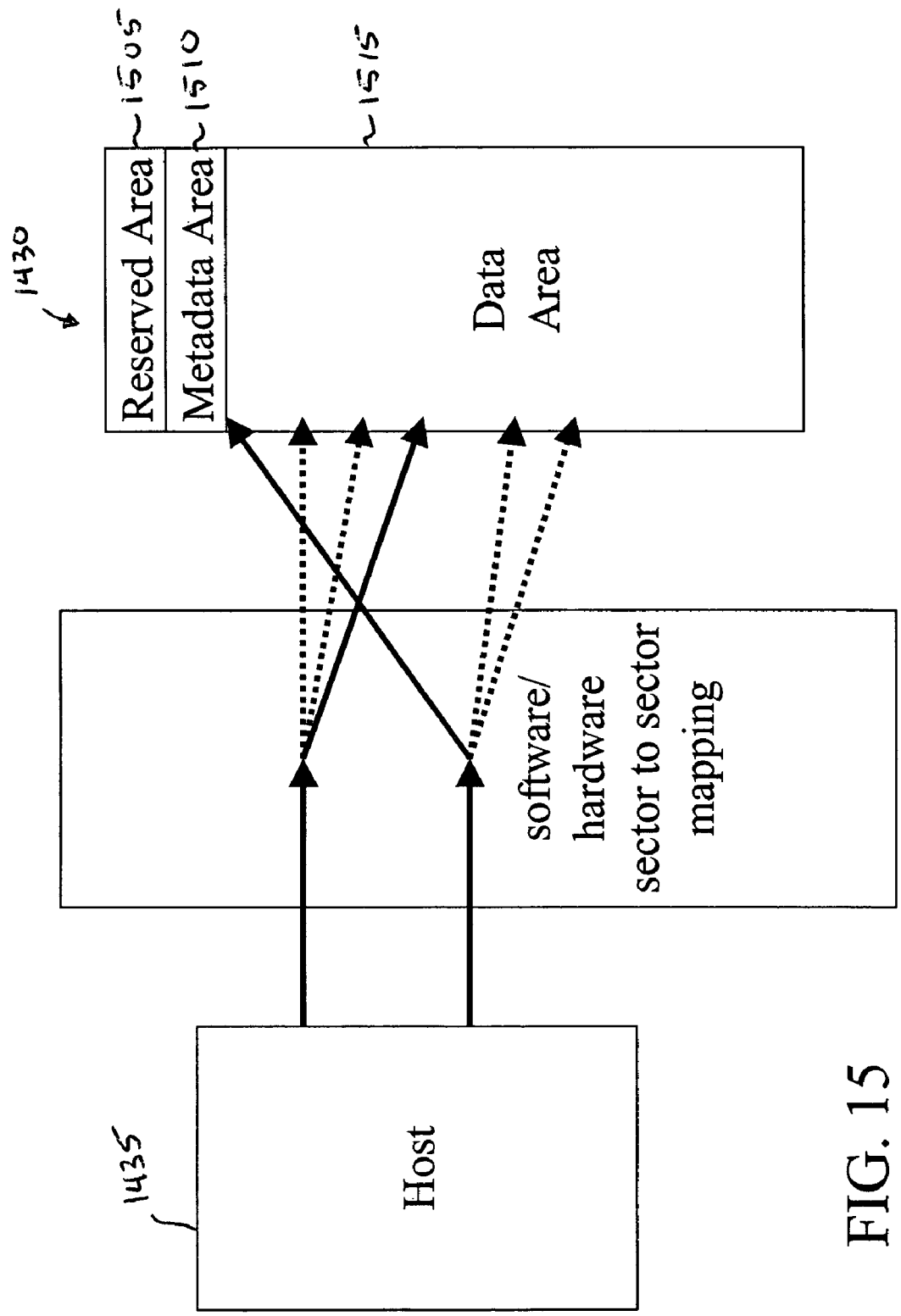
FIG. 15 depicts an exemplary logical view of a mapping between a host and a storage device, in accordance with the embodiment of FIG. 14.

The third embodiment of the present invention may divide at least a portion of a storage device 1430 into a reserved area 1505, a metadata area 1510, and a data area 1515, as shown in FIG. 15. Information from the host 1435 that passes through the embodiment may map to one or more of these areas 1505, 1510, 1515. The metadata area 1510 may contain the super block 1405, the HVBT 1415, the lot map 1420, and a "snapshot" of the HVBT 1415. The data area 1515 may contain the disk log 1410 and the data stored on the storage device 1430. One or more copies of the super block 1405 may be contained in the metadata area 1510, the data area 1515, or both.

As an example, a storage device 1430 with a 160 gigabyte capacity with lot sizes of 16 data blocks may be divided so that a fat allocation partition table, the super block 1405, the lot map 1420, the HVBT 1415, a snapshot of the HVBT 1415, and the disk log 1410 occupy approximately 22,632 megabytes of space. Of this space, approximately two megabytes may be set aside for a file allocation partition table, eight kilobytes for the super block 1405, 36 megabytes for the lot map 1420, 2,195 megabytes for the HVBT 1420, 2195 megabytes for a snapshot of the HVBT 1420, and 18,204 megabytes for the disk log 1410. The remaining space for the storage device 1430 may be used for data storage or other purposes. This foregoing example is merely illustrative of a potential way to assign the number of data blocks in a lot and to allocate a storage device's 1430 space for the tables and other data structures discussed herein. Accordingly, other lot sizes, allocations of space for the tables and other data structures, or storage devices of differing capacities, may be utilized. Further, as previously described above with respect to other embodiments, the various tables, data structures and algorithms of the third embodiment may be located on one or more separate storage devices, one or more hardware elements embedded on or associated with the storage device, control cards, or other hardware devices.

The super block 1410 of the third embodiment may be similar to a super block employed for a hard disk drive's file system. For example, the super block 1410 may contain information regarding the storage device's 1430 identification number, the current version of any related software, and the size of the storage device 1430 reported to a host 1435. Additionally, the super block 1410 may contain information regarding the number of blocks per lot, the sizes and locations of the lot map 1420 and/or HVBTs 1415, the size of an entry for the HVBT 1415, the next lot available for data storage, the number of free lots, the next log identification number, the total number of lots on the storage device 1430, the number of lots that are immediately available for use, the "current lot index", and the "origin lot index", and any other information of interest. The "current lot index" is the index to the next available free lot.

Initially, the "origin lot index" is the index to the lot corresponding to the initial write operation performed by the embodiment and may be used to indicate where the embodiment should start to find lots to return to the lot pool during a free lot operation, as described below. The "origin lot index" may change over time. For example, after executing a return old lots to the available pool, as described below, the "origin lot index" may be changed to indicate that the next lot physically after the last lot selected to be returned to the free lot pool is the "origin lot" (or, alternatively, the selected lot may become the origin lot). Lots prior to the new origin lot are flushed from the history of operations by the embodiment. Thus, from that point on, the embodiment would regard the lot in question as corresponding to the initial write operation, and the lot becomes the origin point.

Accordingly, from a conceptual point of view, the "origin lot" is the lot corresponding to the "first" write operation for the embodiment, and the "origin lot index" indicates the "origin lot." Additionally, lots located between the "origin lot," as indicated by the "origin lot index," and the next available lot, as indicated by the "current lot index," are considered to be located within an "in-history" region. Any lots located within the "in-history" region are potentially available for return to the lot pool during a free lot operation in which the algorithm begins by searching from lots to return starting with the oldest lot.

Figure 16:
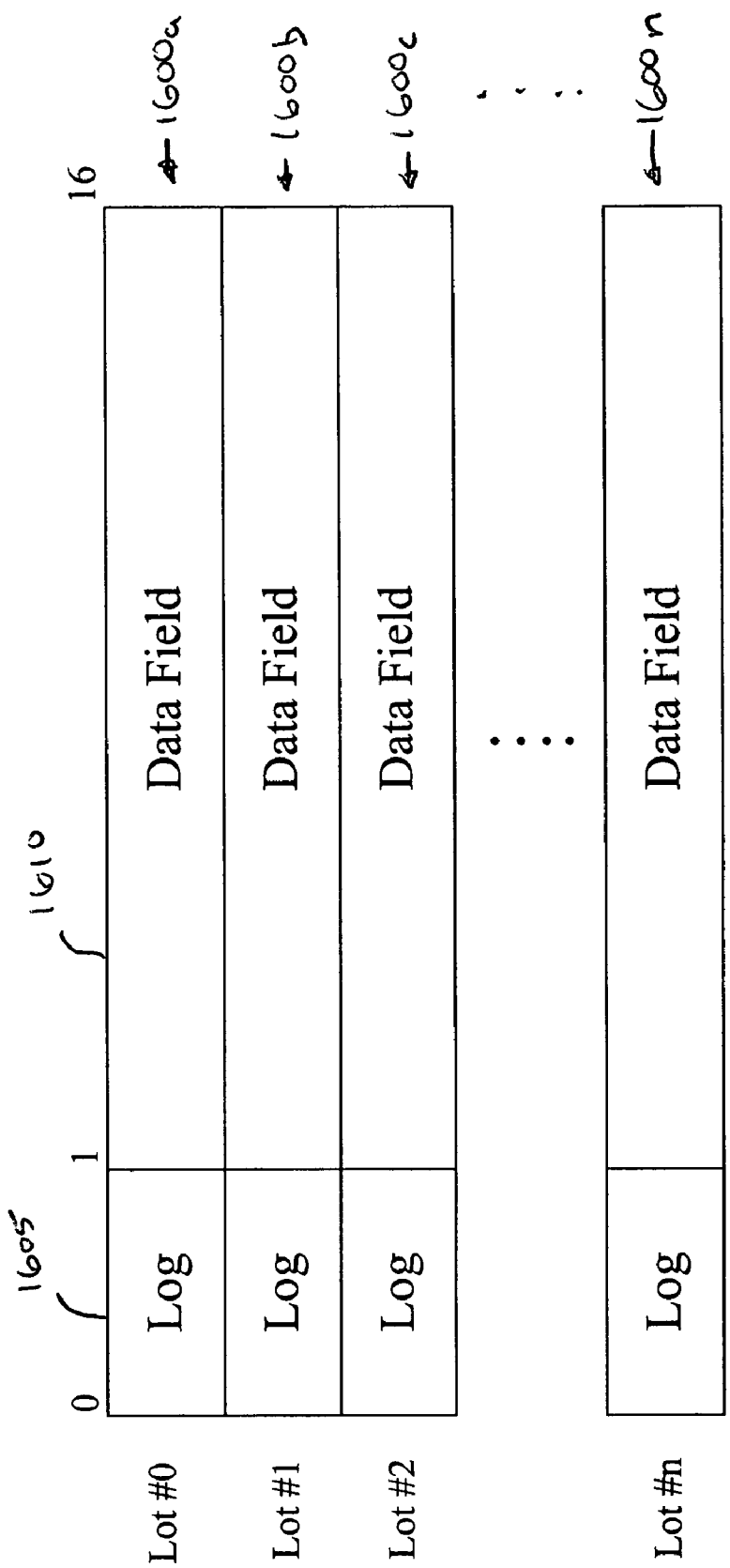
FIG. 16 depicts an exemplary layout for a lot, in accordance with the embodiment of FIG. 14.

A logical representation of a layout for lots 1600a-n on the storage device 1430 is depicted in FIG. 16. It should be understood that the number of lots 100a-n may vary from one embodiment to another. Accordingly, lot 1600n represents a generic end lot, and does not imply a particular number of lots per storage device 1430. Each lot 1600a-n may include a log 1605 and a data field 1610. The log 1605, as described in more detail below, may contain control information for a lot 1600a. The data field 1610 may contain the actual data stored on the storage device 1430 for the lot 1600. In the embodiment depicted in FIG. 16, each log 1605 is one sector and each data field 1610 is sixteen sectors. It should be understood that the number of sectors for a log 1605 and a data field 1610 for any lot 1600a-n may differ from the example presented in FIG. 16. Further, the log 1605 and data field 1610 for any lot 1600a-n may be side-by-side as depicted in FIG. 16 or may be separated.

Figure 17:
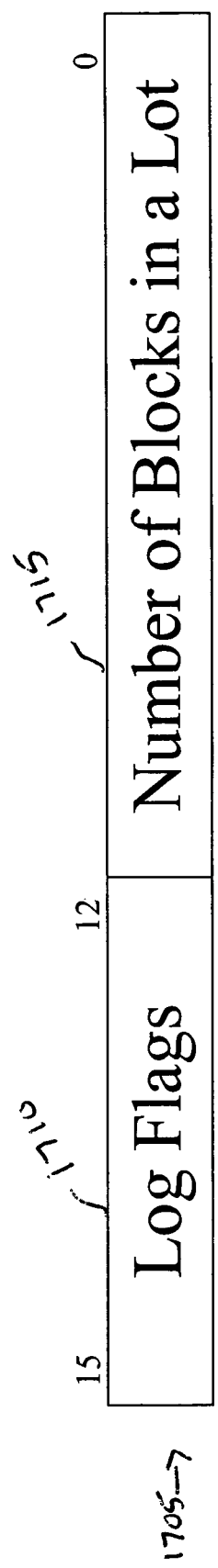
FIG. 17 depicts an exemplary data structure for a record of the lot map, in accordance with the embodiment of FIG. 14.

An example of a data structure for a record 1705 of the lot map 1420 is depicted in FIG. 17. The lot map's record 1705 may include a flag field 1710 and a number field 1715 for a lot. The flag field 1710 may include an in-history flag, a check-point flag, a valid data flag, or any other control information of interest for the lot. The in-history flag may indicate if a lot 1600 is located in an in-history region, as described above. The check-point flag may indicate if a lot 1600 has been investigated for check-pointing. The valid data flag may indicate if at least one block in the lot 1600 contains data. The number field 1715 may indicate the actual number of blocks in the lot that contain data.

Figure 18:
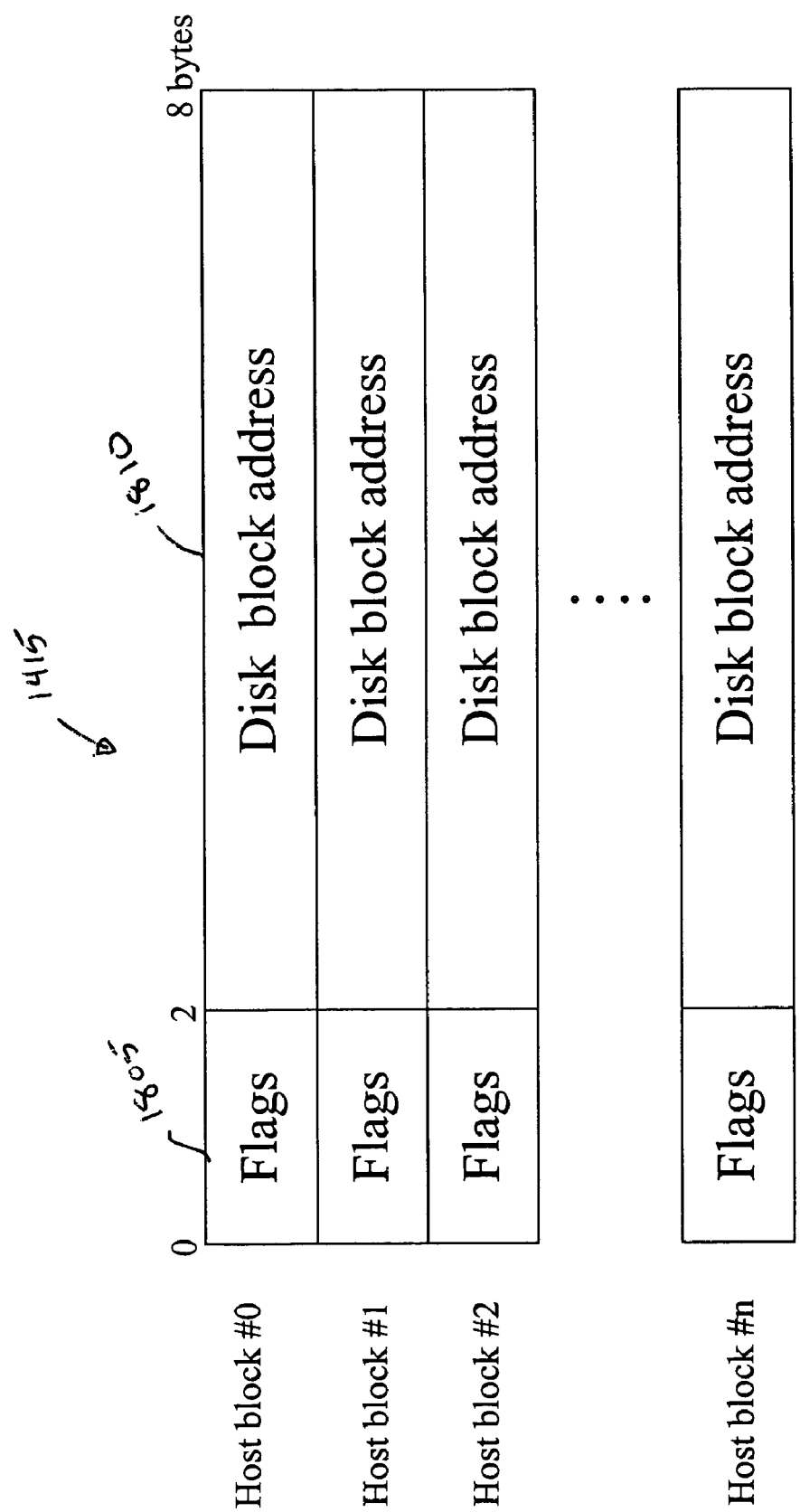
FIG. 18 depicts an exemplary host view block table, in accordance with the embodiment of FIG. 14.

An example of a data structure for the HVBT 1415 is depicted in FIG. 18. The HVBT 1415 may include a flag field 1805 and disk block field 1810. The flag field 1805 may include a valid data flag. The valid data flag may indicate if the block contains data. The disk block field 1810 may indicate the physical address/block to which the host view address/block currently points.

Figure 19:
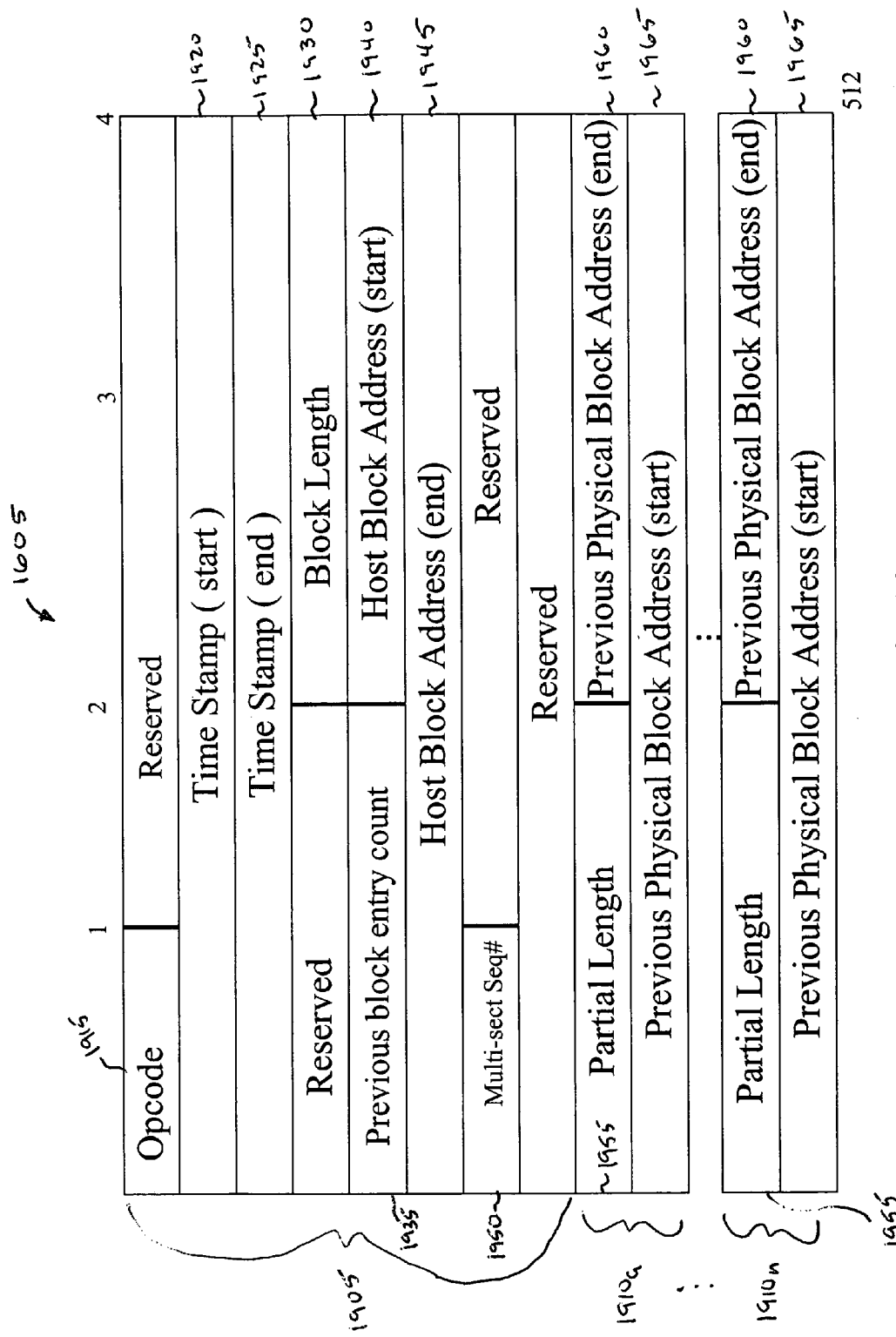
FIG. 19 depicts an exemplary data structure for a log, in accordance with the embodiment of FIG. 14.

An example of a data structure for a log 1600 is depicted in FIG. 19. It should be understood this date structure is exemplary. Alternate embodiments may omit some or all of the listed fields or may include additional fields. Each log 1600a-n may include fields for control information 1905 and fields for one or more "previous block entries" 1910a-n. It should be understood that the numbers of "previous block entries" may vary from one log 1600 to another. Accordingly, "previous block entry" 1910n represents a generic end "previous block entry," and does not imply a particular number of "previous block entries" per log 1600. The previous block entry field generally identifies to what prior physical block, if any, the data corresponding to the log was last written.

The control information fields 1905 may include an operation code fields 1915 (identifying, for example, if the log corresponds to a read or write operation), timestamp fields 1920, 1925 indicating the start and end times of the associated operation, a block length field 1930 indicating the block length for the operation, a "previous block entry count" field 1935 indicating the number of "previous block entries" 1910a-n appended to this log 1605, and host start and end block fields 1940, 1945 indicating the starting and ending host addresses/blocks for the operation. Effectively, the host start and end block fields function as a pointer to one or more host view blocks associated with the log.

When a log 1605 is recorded, it generally should be wholly recorded or not recorded at all because any partial writing of a log 1605 may compromise the integrity of the log records stored by the embodiment. When a log 1605 requires only one sector, hardware associated with the storage device 1430 will generally alert a user if a log 1605 was only partially recorded to a sector. However, when more than one sector is required for a log 1605, hardware associated with the storage may fail to alert a user if a log 1605 was successfully recorded to the multi-sectors. Accordingly, the control information fields 1905 may also include a multi-sector sequence number field 1950, which may be used to store a predefined number to check if a log 1605 has been properly recorded when more than one sector is required to contain the log 1605. The check may be done by writing a number in a sector and the same predefined number in the next sector. If these numbers match, the multi-sector write was likely successful.

Each "previous block entry" 1910a-n may include a partial length field 1955 indicating the number of the blocks referenced in particular "previous block entry" 1910a-n and fields 1960, 1965 for indicating the previous starting and ending physical addresses/blocks for these blocks. The number of "previous block entries" 1910a-n may vary for each log 1605.

Figure 20:
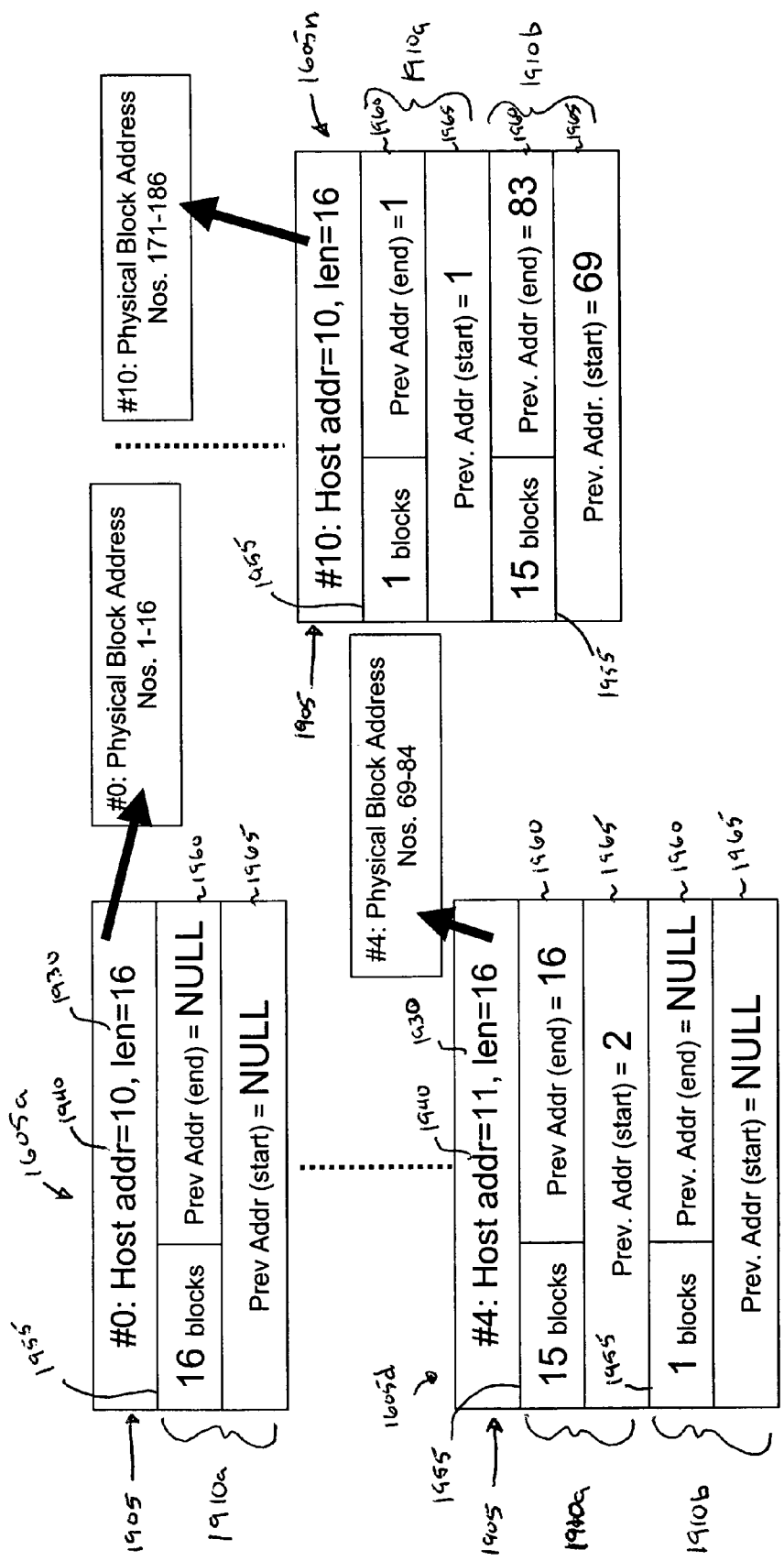
FIG. 20 depicts an example of simplified logs, in accordance with the embodiment of FIG. 14.

An example may assist in conceptualizing a log 1605. FIG. 20 depicts a portion of the control information field 1950 and the "previous block entry" fields 1910a-n for three logs 1605a, d, n that correspond to three write operations. For simplification, only logical representations of portions of the control information field 1905 for each log 1605a, d, n, specifically, the starting host block address field 1940 and the block length field 1930, are shown in FIG. 20. With respect to any "previous block entries" 1910a-n for a log 1605a, d, n, only logical representations of the fields 1955, 1960, 1965 for partial block length and the starting and ending previous physical addresses/blocks are shown in FIG. 20.

As part of the example, assume a first write operation. This first write operation is represented by log #0 1065a and writes 16 logical blocks starting from host view address/block 10 and ending at host view address/block 25. Further, assume that the 16 logical blocks for the first write operation are written to physical addresses/blocks one through 16 on the storage device 1430. Accordingly at the first write operation, host view address/block 10 points to physical address/block one (functioning as a pointer), host view address/block 11 points to physical address/block two, and so on. A first log 1605a will be recorded reflecting this write operation. For the control structure fields 1905 of this first log 1605a, the starting host view address/block is 10 and the block length is 16. Since this is the first write operation, there will be one "previous block entry" 1910a for the first log 1605a. The partial length for this "previous block entry" is 16 (representing 16 blocks) and the "previous physical address entry" is NULL (since this is the first time a write operation has occurred at host view addresses/blocks 10 through 26).

Now assume a fifth write operation time occurs at a later time. This fifth write operation is represented by log #4 1605d, and writes 16 logical blocks starting from host view address/block 11 and ending at host view address/block 27. Further, assume that the 16 logical blocks for the fifth write operation are written to physical addresses/blocks 69 through 84 on the storage device 1430. Finally, assume that host view addresses/blocks 11 through 25 have only been previously written to at the first write operation and that host view address/block 26 has not yet been written to. Accordingly, just prior to the fifth write operation, host view addresses/blocks 11 through 25 point to physical addresses/blocks two through 16, respectively, and host view address/block 26 points to NULL. After the fifth write operation, host view addresses/blocks 11 through 25 points to physical addresses/blocks 69 through 83, respectively, and host view address/block 26 points to physical address/block 84.

Continuing the example, a fifth log 1605d is recorded corresponding to this fifth write operation. For the control structure fields 1905 of this fifth log 1605d, the starting host view address/block is 11 and the block length is 16. There are two "previous block entries" 1910a-b for the fifth log 1605d because host view addresses/blocks 11 through 25 (i.e., 15 of the host view addresses/blocks) are overwritten for the first time and host view address/block 26 is written to for the first time. For the first "previous block entry" 1910a of the fifth log 1605d, the partial length is 15 because 15 consecutive host view addresses/blocks (i.e., host view addresses/blocks 11 through 25) are overwritten, and the "previous starting physical block address" is 2 since host view address/block 11 pointed to physical address/block 2 prior to the fifth write operation. For the second "previous block entry" 1910b of the fifth log 1605d, the partial length is one because one host view address/block (i.e., host view address/block 26) is written to for the first time, and the "previous physical starting block address" is NULL.

Continuing with the example, assume an eleventh write operation occurs at a later time. This eleventh write operation is represented by log #10 1605n, and writes 16 logical blocks starting from host view address/block 10 and ending at host view address/block 25. Further, assume that the 16 logical blocks for the eleventh write operation are written to physical addresses/blocks 171 through 186 on the storage device 1430. Finally, assume that host view address/block 10 has only been previously written to at the first write operation and that host view addresses/blocks 10 through 25 have only been previously written to at the first and fifth write operations. Accordingly, just prior to the eleventh write operation, host view address/block 10 points to physical address/block 1, and host view addresses/blocks 11 through 25 point to physical addresses/blocks 69 through 83, respectively. After the eleventh write operation, host view addresses/blocks 10 through 25 point to physical addresses/blocks 171 through 186, respectively.

An eleventh log 1605n is recorded corresponding to this eleventh write operation. For the control structure fields 1905 of this eleventh log, the starting host view address/block is 19 and the block length is 16. There are two "previous block entries" 1910a-b for the eleventh log because host view address/block 10 is overwritten for the first time and host view addresses/blocks 11 through 25 are overwritten for the second time. For the first "previous block entry" 1910a of the eleventh log 1605n, the partial length is one because a single host view address/block (i.e., host view address/block 10) is overwritten for the first time, and the "previous starting physical address" is one since host view address/block 10 pointed to physical address/block one prior to the eleventh write operation. For the second "previous block entry" 1910b of the eleventh log 1605n, the partial length is 15 because 15 consecutive host view addresses/blocks (i.e., host view addresses/blocks 11 through 25) are overwritten for the second time, and the "previous starting physical block address" is 69 since host view address/block 11 pointed to physical address/block 69 prior to the eleventh write operation.

Figure 21:
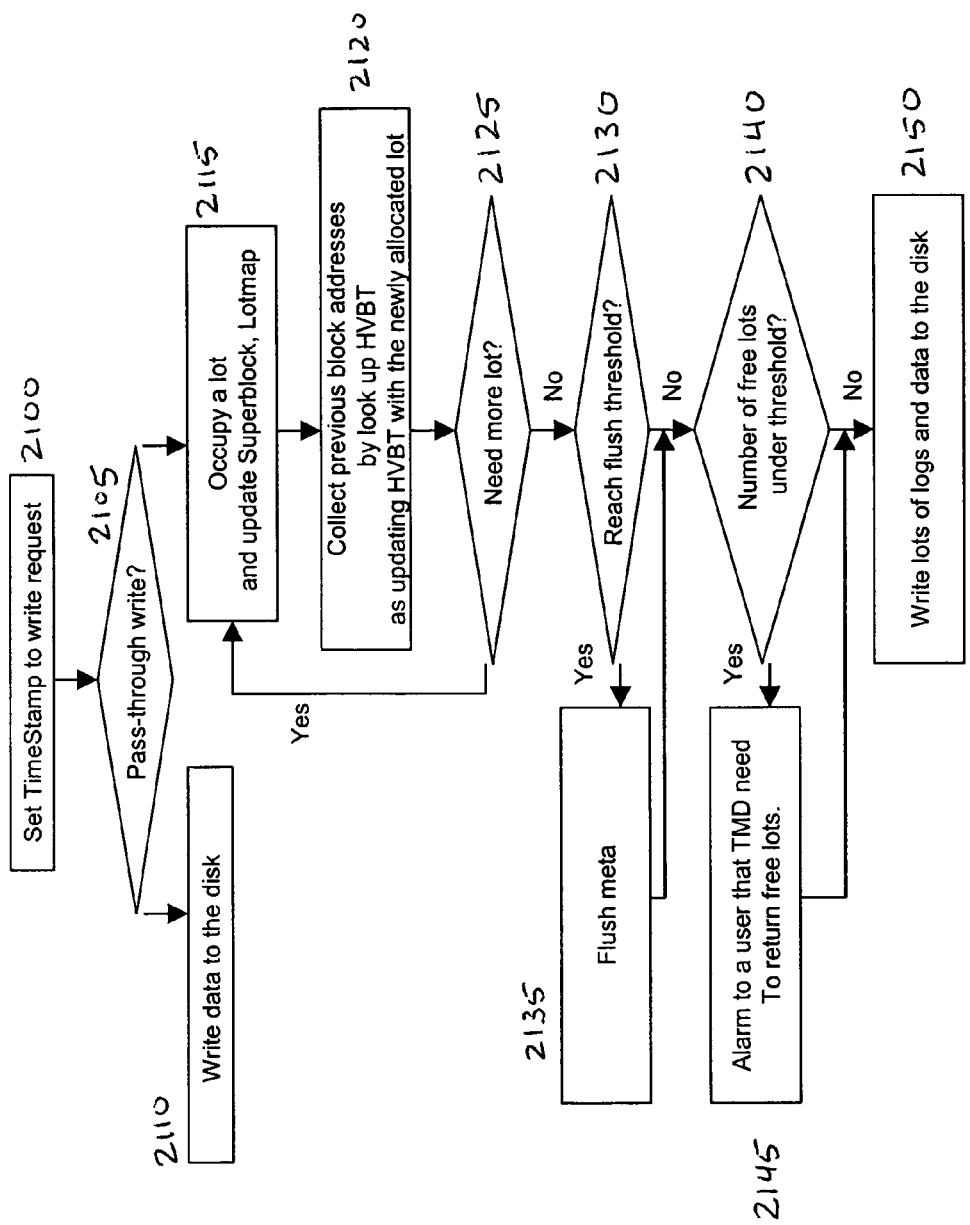
FIG. 21 is a flowchart generally depicting a write operation.

The general write operation of the third embodiment is depicted in the flowchart of FIG. 21. In operation 2100, the embodiment receives a command to set timestamp for a write data request to the storage device 1430. Next, the embodiment determines in operation 2105 if the write data operation will be a pass-through write. If the write operation is a pass-through write, then, in operation 2110 the data is written to the storage device 1430 and the process ends. If the write operation is not a pass-through write, in operation 2115 the embodiment is accessed and determines an available lot to write the data. The embodiment also updates the super block 1405 and the lot map 1420 with the corresponding lot and/or write information. Next in operation 2120, the embodiment updates the HVBT 1415 with the newly allocated lot address.

In operation 2125, the embodiment determines if another lot is required to write the data. This typically occurs if the size of the data is greater than a single lot's storage capacity. If another lot is required, the embodiment returns to operation 2115 to allocate additional lots. If another lot is not required, the embodiment executes operation 2130 and determines if a specified threshold capacity of the metadata area 1510 ("flush threshold"), which may or may not be the storage space set aside for the metadata area 1510, has been reached. If the flush threshold has been reached, the existing metadata may be approaching a limit and some metadata may need to be purged to facilitate further operation of the embodiment. Accordingly, in operation 2135, the embodiment deletes select metadata in the metadata area 1510 to free up space in the metadata area 1610. Typically, the oldest lot map records 1705 and corresponding HVBT 1415 entries are deleted. This may result in the return of old lots to the free lot pool, as described below.

Regardless of whether or not the embodiment flushes metadata, in operation 2140 the embodiment determines if the number of free lots available on the storage device 1430 is under a specified lot threshold number, which may be any number of lots greater than or equal zero. Alternatively, the specified lot threshold number may be the minimum number of lots required for writing the data to the storage device 1430. If the number of free lots is less than the lot threshold number, the embodiment executes operation 2145 and may alert a user that occupied lots on the storage device 1430 need to be returned (or otherwise made available) for use in future write operations. Alternatively, the embodiment may automatically act to free lots, with or without notifying the use. Regardless of whether or not the embodiment alerts a user that occupied lots on the storage device 1430 need to be returned, the embodiment, in operation 2150, writes the data to the storage device 1430.

Figure 22:
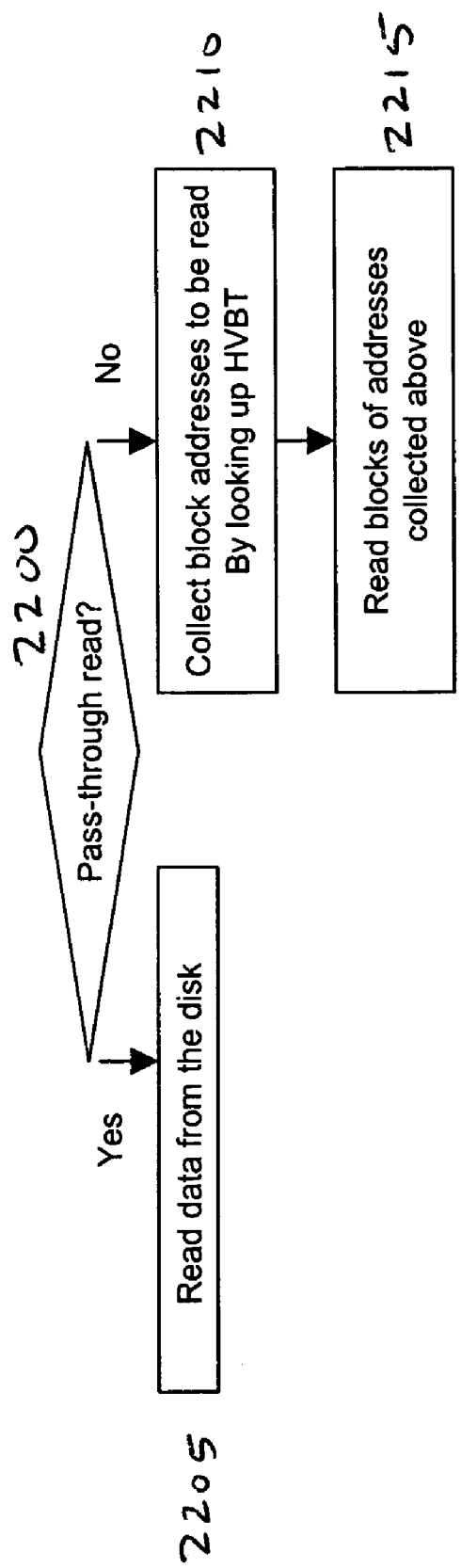
FIG. 22 is a flowchart generally depicting a read operation.

The general read operation of the third embodiment is depicted in the flowchart of FIG. 22. In operation 2200, the embodiment determines if a read data request is a pass-through read. If the read data request is a pass-through read, the embodiment accesses operation 2205 and reads the data from the storage device 1430. If the read data request is not a pass-through read, the embodiment executes operation 2210 and collects the block address to be read. The block addresses to be read may be collected from corresponding entries in the HVBT 1415. The embodiment then, in operation 2215, reads data in the block addresses collected in operation 2210.

Figure 23:
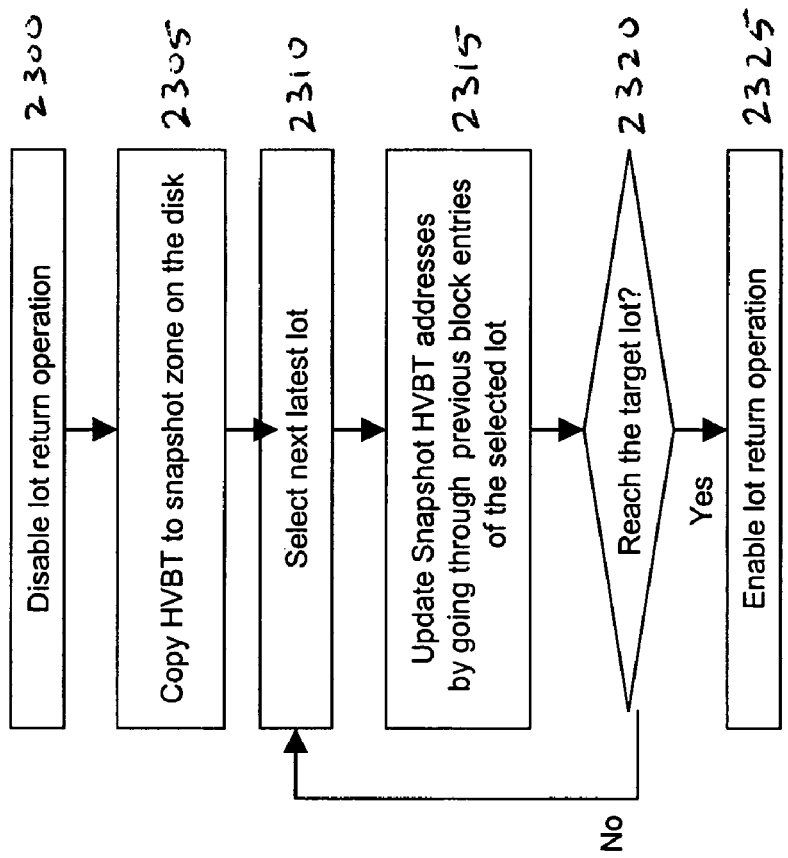
FIG. 23 is a flowchart generally depicting an operation to retrieve data.

Since data is only overwritten when necessary or authorized by a user, data (or corresponding files) from a particular prior time may be retrieved by the embodiment. Generally, FIG. 23 is a flowchart depicting a series of operations executed by the embodiment to retrieve data in the state it existed at a previous time (a "snapshot" of the data as of the time in question). It should be noted that the desired time may be user-specified.

Initially, in operation 2300, the embodiment disables any lot return operations. The lot return operation is discussed in more detail below. Briefly, the lot return operation permits the embodiment to reallocate used lots as free lots to facilitate further data storage.

Next, in operation 2305, the embodiment copies the HVBT 1415 in its current format to a snapshot zone designated on the storage medium 1430. The snapshot zone may be in the metadata portion 1510 of the storage medium 1430, or it may be in the data storage portion 1515 of the storage medium 1430. By copying the HVBT 1415 in this manner, the embodiment may effectively "roll back" through the various lots' logs and return the HVBT 1415 to the state it occupied at the specified prior time, without altering the actual HVBT 1415.

In operation 2310, the embodiment accesses the log 1605 of the prior lot. The first time the embodiment executes operation 2310, the prior lot is the last lot written before the snapshot retrieval operation commences. The embodiment may use the log 1605 of the lot to update the snapshot HVBT addresses in operation 2315. Specifically, the embodiment may retrieve the previous block entries 1910a-n from the lot log 1605, which (as discussed above) indicate which physical addresses/blocks the host addresses/blocks pointed to prior to the execution of the operation corresponding to the lot in question. That is, the previous block entries 1910a-n may indicate where the host blocks were written on the physical blocks of the storage medium 1430 before the write operation of the log 1605 occurred. The embodiment may employ this information to change the records of the snapshot HVBT; the entries of the snapshot HVBT are updated so that the host view blocks correspond to the physical blocks in accordance with the retrieved previous block entries. Essentially, this returns the snapshot HVBT to the state the HVBT 1415 was in prior to execution of the operation associated with the prior lot.

In operation 2320, the embodiment determines if the target lot has been reached. The "target lot" is the lot written at the time of the snapshot, or, if no such log exists, the first lot written prior to the time of the snapshot. If the target lot has not been reached, the embodiment returns to operation 2310 and accesses the log 1605 of the prior lot. Now, the "prior lot" is the lot prior to the one previously accessed in operation 2315. Effectively, the lot accessed is decremented by one, thus permitting the embodiment to continue the process of rolling back the snapshot HVBT.

When the target lot is reached, the snapshot HVBT's state will be updated to match the state of the HVBT 1415 at the desired time. Thus, the embodiment may provide a view of the data resident on the storage medium 1430 matching the view at the desired time- or, in other words, the embodiment may provide the desired snapshot. The embodiment may, for example, present the snapshot to a user through a display (such as a computer monitor, television, other display screen, printer, and so forth). Accordingly, the retrieval of the snapshot is complete, and the lot return operation may be re-enabled in operation 2325.

Figure 24:
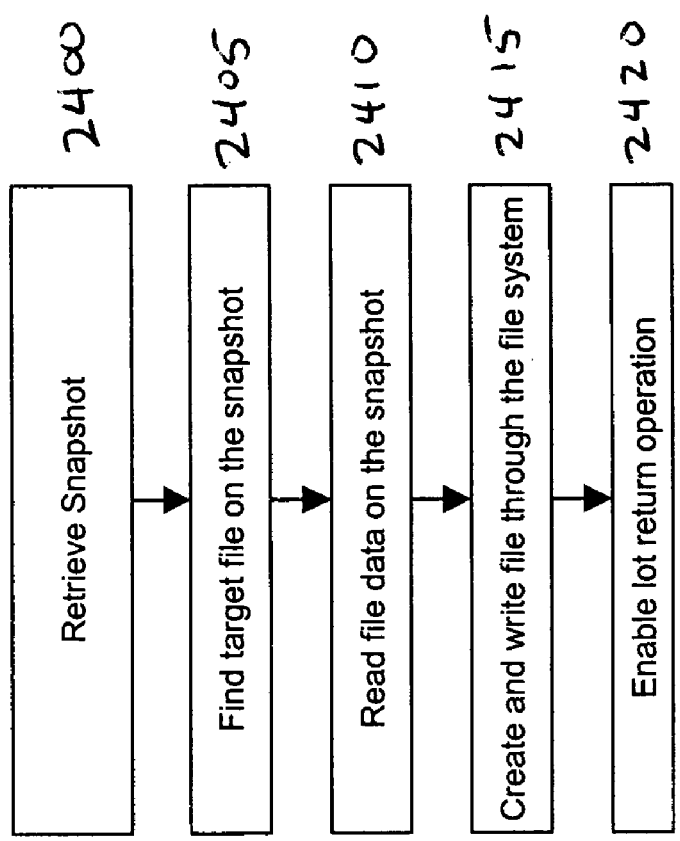
FIG. 24 is a flowchart generally depicting an operation to recover data.

FIG. 24 depicts a method that may be executed by the embodiment in order to recover old data that may appear to the host to be overwritten, such as an old version of a file. Initially, in operation 2400, the embodiment retrieves a snapshot of the storage medium 1430 as of the desired time, which is typically the time at which the old data existed. The method for retrieving a snapshot in this manner is generally discussed above with respect to FIG. 23.

After retrieving the snapshot, the embodiment may execute operation 2405, in which it seeks the target file (or data) on the snapshot of the HVBT 1415. The embodiment seeks the target file on the snapshot of the HVBT 1415 as generally described above and also as known to those of ordinary skill in the art, in accordance with (for example) the file system and operating system used to access data on the storage medium 1430.

In operation 2410, the embodiment may read the file data accessed from the snapshot HVBT. In operation 2415, the embodiment may write the file data to the storage medium 1430 through the file system, generate a lot and log 1605 for the write operation, and update the original (non-snapshot) HVBT 1415 accordingly. In this manner the retrieval and writing of the old data/old file may be logged by the embodiment in a manner similar to a standard write operation.

Finally, in operation 2420, the various lot return processes may be re-enabled.

In addition, the snapshot retrieval process may be employed to "roll back" the entire storage medium 1430 to the desired time (i.e., the time of the snapshot). After the snapshot retrieval procedure of FIG. 23 is performed, the embodiment may enable all input/output operations (such as reads and writes to the storage medium 1430), copy the snapshot HVBT over the original HVBT 1415, and update the file system accordingly to reflect the changes in the HVBT 1415. It should be noted that the operations associated with updating the file system may vary with the type of file system employed. The lots and lot logs 1605 may likewise be updated, lots occurring after the snapshot time may be deleted or ignored, or such lots may be unaltered. It should also be noted that the snapshot HVBT need not necessarily be copied over the original HVBT 1415. The embodiment may instead update the file system to reference and employ the snapshot HVBT instead of the original HVBT 1415. In this manner, should a user wish to return the disk to a pre-rollback state, the embodiment may update the file system to reference and employ the original, unaltered HVBT 1415.

Figure 25:
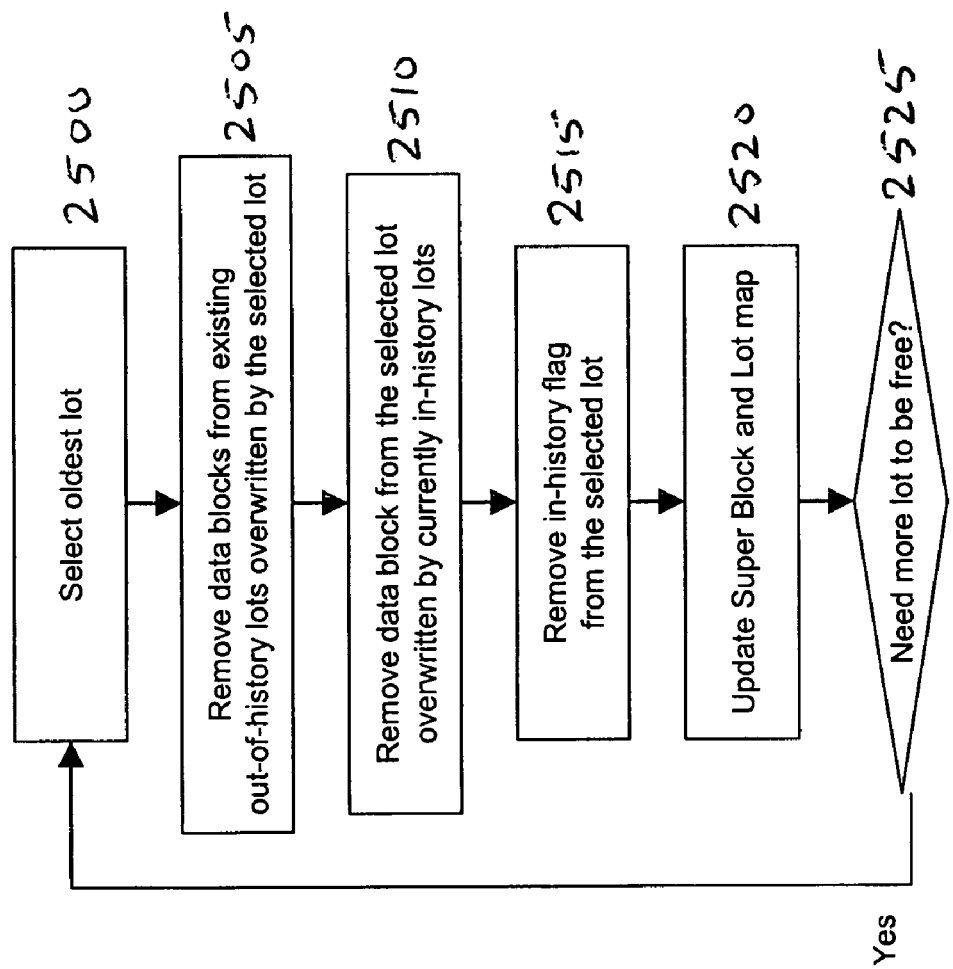
FIG. 25 is a flowchart generally depicting an operation to return lots to a lot pool.

FIG. 25 generally depicts a method for returning old lots to the available pool. This may be desirable, for example, when the data writing portion of the storage medium 1430 nears its capacity. By returning old lots to the available pool, additional write operations in accordance with the embodiment's operation may be performed.

Initially, the embodiment selects a lot in operation 2500. The oldest lot is generally chosen because it represents the oldest data written to the storage medium 1430, and thus the data least likely to need recovering at a later date. The oldest lot is earliest lot between the current write point/operation and a current origin point. It should be noted that the current origin point may be moved, as described below.

Figure 26:
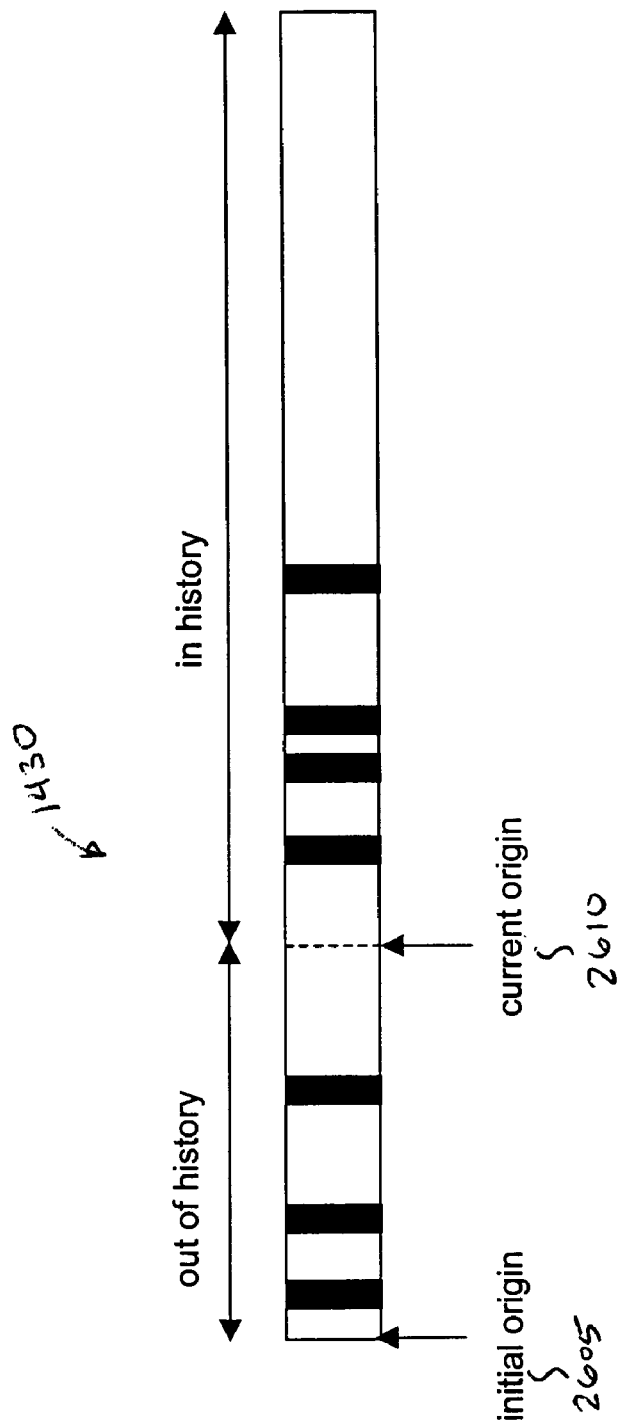
FIG. 26 is a logical representation of a storage device, in accordance with the embodiment of FIG. 25.

With respect to the origin point, FIG. 26 generally depicts a storage medium 1430 with an initial origin 2605 and a current origin 2610. The "current origin" 2610 is the origin point as of the current time, while the "initial origin" 2605 is the origin point at the time the first write operation to the storage medium 1430 was executed by the embodiment. As the origin point moves, lots may fall between the initial origin 2605 and current origin 2610. Such lots are generally referred to as "out-of-history lots." By contrast, lots between the current write operation and current origin are "in-history lots." In FIG. 26, occupied lots are generally shown as black boxes.

Returning to FIG. 25, once the operation has identified the oldest lot, it may act to free certain out-of-history lots and return such lots to the pool of available physical blocks ("available pool"). In operation 2505, the embodiment identifies which out-of-history lots were overwritten by the selected, oldest lot. That is, certain out-of-history lots may be older version of the data stored in the oldest lot. The embodiment (still in operation 2505) may remove the data block from such out-of-history lots.

In operation 2510, the embodiment may remove the data block from the oldest lot, so long as the oldest lot has been overwritten by an in-history lot.

In operation 2515, the embodiment may remove the in-history flag from the selected, oldest lot. This identifies the oldest lot as no longer being an in-history lot, and sets the current origin to equal the oldest lot.

In operation 2520, the embodiment may update the super block 1405 and lot map 1420. Such updates generally include removing any or all log data associated with the out-of-history lots acted upon in operation 2505 and log data associated with the oldest lot. The embodiment may also update the lot map 1420 and super block 1405 to indicate these physical blocks are again free lots.

In operation 2525, the embodiment determines if sufficient lots have been returned to the available pool. In the event no more lots are needed, the process terminates. Otherwise, the embodiment returns to operation 2500 and reiterates the process. (Because the oldest lot identified in the second iteration of operation 2500 is different from the oldest lot identified in the first iteration, different out-of-history lots may be flagged in operation 2505 to be returned to the available pool.)

Generally, the embodiment does not simply return all out-of-history lots to the available pool. It is conceivable that an out-of-history lot may be the most recent copy of data or a file, and thus returning it as a free lot would cause the most recent copy of the data to be lost. Accordingly, the afore-described operation prevents such losses.

FIG. 27 generally depicts a method for returning all lots (or blocks) associated with a particular file to the available pool. Initially, in operation 2700, the embodiment deletes the file through the file system in a conventional manner. Next, in operation 2705, the embodiment flushes the storage medium 1430, partition, or other volume to reflect this deletion.

In operation 2710, the embodiment disables the lot return operation described above with respect to FIGS. 25 and 26. This prevents inadvertent allocation of lots to the available pool during the present process.

Next, in operation 2715, the embodiment creates a snapshot of the HVBT 1415 and copies the snapshot HVBT to the snapshot zone. This procedure was generally described above with respect to FIG. 23. In this particular process, the desired time of the snapshot is the time at which the process of FIG. 27 is initiated.

In operation 2720, the embodiment cleans the metadata of the file system. This typically includes clearing the file system bitmap and the lot map 1420. The file system bitmap referenced in operation 2720 is that of the standard file system employed by the storage medium and/or host. "Cleaning" the file system bitmap is the operation of setting the blocks of the file that is to be deleted to a free state in the bitmap of the file system.

Continuing with operation 2720, the embodiment also removes the current lot, if corresponding to (or occupied by) some version of the deleted file, from the lot map. This, in turn, flags the lots as free and returns them to the available pool. It should be noted that the cleanup operations of operation 2720 are executed only if the current lot corresponds to the deleted file. If the current lot does not correspond to the deleted file, no metadata must be cleaned.

In operation 2725, the snapshot of the HVBT 1415 is rolled back in a manner described above, in FIG. 23, with respect to operations 2300-2325. That is, the snapshot HVBT is adjusted to the state the HVBT 1415 occupied immediately prior to the write operation corresponding to the last write of the deleted file (i.e., the last lot of the deleted file). Essentially, the snapshot HVBT is updated to remove the operations associated with the last lot of the file, and the correspondence between host view blocks and physical blocks is rolled back accordingly.

In operation 2730, the embodiment determines if the origin lot has been reached. If the origin lot has not been reached, then all prior write operations associated with the file being deleted may not have been removed. Accordingly, the embodiment proceeds to the next-most recent lot and re-executes operation 2720. Thus, the embodiment rolls back through all lots until the origin lot is reached, deleting only those lots associated with some version of the deleted file. All other lots are ignored and the lot map 1420 is not adjusted. Only when a lot associated with some version of the deleted file is found and cleaned is the lot map 1420 updated.

After the embodiment reaches the origin lot, operation 2735 is accessed and lot return operations are again enabled. It should be noted that, following operation 2730, the embodiment may erase the snapshot HVBT.

Alternative embodiments may entirely omit the process of making a snapshot HVBT and instead update the standard HVBT.

As previously mentioned, the storage device may be located remotely from the host and accessed across a network. In such situations, it may be relatively simply to add an additional storage device to be accessed by the host (or hosts) across the network when either the virgin or overwrite areas of the first storage device become filled. This would prevent overwriting of data. Such an embodiment would be especially advantageous where the remote storage devices could be presented to the host as a locally-accessible device, rather than a device accessed across a network. Local presentation of the storage devices may simplify interaction between the storage devices and the host, including the reading, writing, and restoring of data. This presentation may be accomplished by means of a driver, software application, firmware, or hardware. For example, the NetDisk product manufactured by XIMETA, Inc. of Irvine, Calif. may be especially useful in certain applications and embodiments described herein.

Those of ordinary skill in the art will appreciate that the storage device, look-up table, and methods for storage may all take a variety of forms. Although the invention has been described with respect to particular embodiments and methods of operation, it should be understood that those embodiments and methods of operation are exemplary, rather than limiting. Accordingly, alternate embodiments and/or methods of operation may occur to those skilled in the art upon reading this disclosure, and are embraced by the present invention.

What is claimed is:

1. An apparatus for storing data, comprising:
   a metadata area;
   a storage area operatively associated with the metadata area and comprising at least a first and second physical block;
   a host view block table operative to associate a first host block with the first physical block;
   a first log operatively associated with a first datum including a first order indicator associated with the writing order of the first datum and a first pointer associating the first log with the first host block; and
   a second log operatively associated with a second datum including a second order indicator with the writing order of the second datum,
   wherein the second log further includes:
      a block length indicating a number of blocks occupied on the storage area by the second datum;
      a second pointer associating the second log with a second host block; and
      a previous block address associating the log with a prior storage of the second datum.

2. The apparatus of claim 1, wherein:
   the second datum is a version of the first datum;
   the previous block address of the second log corresponds to a physical address of the first datum; and
   the second host block and the first host block are the same.

3. The apparatus of claim 1, wherein the host view block table is stored in the metadata area.

* * * * *